(12) United States Patent
Dolinar

(10) Patent No.: US 7,410,687 B2
(45) Date of Patent: Aug. 12, 2008

(54) VARIEGATED COMPOSITES AND RELATED METHODS OF MANUFACTURE

(76) Inventor: Blair Dolinar, 289 Hunters Ridge Rd., Winchester, VA (US) 22602

( * ) Notice: Subject to any disclaimer, the term of this patent is extended or adjusted under 35 U.S.C. 154(b) by 325 days.

(21) Appl. No.: 10/862,448

(22) Filed: Jun. 8, 2004

(65) Prior Publication Data
US 2005/0271872 A1 Dec. 8, 2005

(51) Int. Cl.
*D04H 1/00* (2006.01)
(52) U.S. Cl. .................... 428/292.1; 428/292.4
(58) Field of Classification Search ............. 428/292.4, 428/292.1; 52/738.1
See application file for complete search history.

(56) References Cited

U.S. PATENT DOCUMENTS

| | | | |
|---|---|---|---|
| 942,852 A | 12/1909 | Baekeland | |
| 1,700,208 A | 1/1929 | Paisseau | |
| 1,981,848 A | 4/1929 | Land et al. | |
| 2,067,012 A | 1/1937 | Loetscher | |
| 2,149,066 A | 2/1939 | Camillo | |
| 2,332,829 A | 10/1943 | Parsons et al. | |
| 2,682,031 A | 2/1951 | Fisch | |
| 2,617,148 A | 11/1952 | Ryan | |
| 2,702,408 A | 2/1955 | Hartland | |
| 2,736,064 A | 2/1956 | Rubin | |
| 2,744,013 A | 5/1956 | Dorland et al. | |
| 2,759,222 A | 8/1956 | Bowers | |
| 2,832,993 A | 5/1958 | Cox | |
| 3,023,136 A | 2/1962 | Himmelheber et al. | |
| 3,095,608 A | 7/1963 | Munsell | |
| 3,096,297 A | 7/1963 | Peterkin et al. | |
| 3,210,451 A | 10/1965 | Manning et al. | |
| 3,222,719 A | 12/1965 | Wagner et al. | |
| 3,243,327 A | 3/1966 | Hoppeler et al. | |
| 3,328,501 A | 6/1967 | Barnett | |
| 3,360,462 A | 12/1967 | Littler | |
| 3,461,496 A | 8/1969 | Winstead | |
| 3,478,138 A | 11/1969 | Friesner | |
| 3,511,750 A | 5/1970 | Hider | |
| 3,651,187 A | 3/1972 | Cessna, Jr. | |
| 3,671,615 A | 6/1972 | Price | |
| 3,769,380 A * | 10/1973 | Wiley | 264/40.6 |
| 3,798,294 A | 3/1974 | Hollenbeck | |

(Continued)

FOREIGN PATENT DOCUMENTS

BE 837086 A 4/1976

(Continued)

OTHER PUBLICATIONS

*Plastics Extrusion Technology and Theory*, Gerhard Schenkel, et al., (1963).

(Continued)

*Primary Examiner*—N Edwards

(57) ABSTRACT

Embodiments of the invention include a composite. The composite includes a crystalline polymer, a plurality of wood fibers blended with the crystalline polymer, an outer surface, and an amorphous polymer visible on the outer surface. The amorphous polymer has a first color and the blend of the crystalline polymer and the plurality of wood fibers has a second color different from the first color. The invention also includes a method of manufacturing the wood-plastic composites such that one polymer is shifted in the composite relative to the other polymer.

59 Claims, 7 Drawing Sheets

U.S. PATENT DOCUMENTS

| | | |
|---|---|---|
| 3,817,680 A | 6/1974 | Gultner et al. |
| 3,875,088 A | 4/1975 | Arons et al. |
| 3,888,810 A | 6/1975 | Shinomura |
| 3,890,077 A | 6/1975 | Holman |
| 3,908,902 A | 9/1975 | Collins et al. |
| 3,915,910 A | 10/1975 | Nakano et al. |
| 3,919,164 A | 11/1975 | Hattori et al. |
| 3,927,235 A | 12/1975 | Chow |
| 3,956,541 A | 5/1976 | Pringle |
| 4,003,866 A | 1/1977 | Paturle |
| 4,008,858 A | 2/1977 | Yamada et al. |
| 4,011,292 A * | 3/1977 | Randall ................ 264/75 |
| 4,013,616 A | 3/1977 | Wallace |
| 4,018,722 A | 4/1977 | Baker |
| 4,028,448 A | 6/1977 | Hashimoto et al. |
| 4,045,603 A | 8/1977 | Smith |
| 4,050,978 A | 9/1977 | Moore |
| 4,056,591 A | 11/1977 | Goettler et al. |
| 4,065,413 A | 12/1977 | MacInnis et al. |
| 4,091,153 A | 5/1978 | Holman |
| 4,100,328 A | 7/1978 | Gallagher |
| 4,115,490 A | 9/1978 | Munk |
| 4,138,534 A | 2/1979 | Tedesco |
| 4,150,185 A | 4/1979 | Prymelski |
| 4,154,893 A | 5/1979 | Goldman |
| 4,168,251 A | 9/1979 | Schinzel et al. |
| 4,172,102 A | 10/1979 | Hoene et al. |
| 4,179,270 A | 12/1979 | Clayton et al. |
| 4,187,352 A | 2/1980 | Klobbie |
| 4,209,561 A | 6/1980 | Sawko |
| 4,225,318 A | 9/1980 | Wrigley, Jr. |
| 4,225,640 A | 9/1980 | Erb |
| 4,225,649 A | 9/1980 | Peterson |
| 4,226,820 A | 10/1980 | Bjorhaag |
| 4,228,116 A | 10/1980 | Colombo et al. |
| 4,250,222 A | 2/1981 | Mavel et al. |
| 4,260,573 A | 4/1981 | Overman |
| 4,279,790 A | 7/1981 | Nakajima |
| 4,302,210 A | 11/1981 | Duncan |
| 4,323,625 A | 4/1982 | Coran et al. |
| 4,326,854 A | 4/1982 | Tanner |
| 4,328,320 A | 5/1982 | Reszniak et al. |
| 4,340,513 A | 7/1982 | Moteki et al. |
| 4,364,979 A | 12/1982 | Dutton |
| 4,376,144 A | 3/1983 | Goettler |
| 4,379,525 A | 4/1983 | Nowicki et al. |
| 4,481,701 A | 11/1984 | Hewitt |
| 4,510,278 A | 4/1985 | Hoetjer |
| 4,528,309 A | 7/1985 | Göte et al. |
| 4,615,853 A | 10/1986 | Aoyama et al. |
| 4,626,189 A | 12/1986 | Hammer et al. |
| 4,632,795 A | 12/1986 | Huber et al. |
| 4,656,722 A | 4/1987 | Armstrong |
| 4,663,103 A | 5/1987 | McCullough et al. |
| 4,717,742 A | 1/1988 | Beshay |
| 4,738,808 A | 4/1988 | Hammer et al. |
| 4,751,034 A | 6/1988 | DeLong et al. |
| 4,772,430 A | 9/1988 | Sauda et al. |
| 4,783,493 A | 11/1988 | Motegi et al. |
| 4,791,020 A | 12/1988 | Kokta |
| 4,797,242 A | 1/1989 | Fukuda et al. |
| 4,812,368 A | 3/1989 | Scherzer et al. |
| 4,822,826 A | 4/1989 | Pommier et al. |
| 4,824,627 A | 4/1989 | Hammer et al. |
| 4,832,882 A | 5/1989 | Moylan |
| 4,882,112 A | 11/1989 | Maki et al. |
| 4,885,203 A | 12/1989 | Wakat |
| 4,888,573 A | 12/1989 | Dunn |
| 4,913,863 A | 4/1990 | Burrafato et al. |
| 4,915,764 A | 4/1990 | Miani |
| 4,937,100 A | 6/1990 | Lanters et al. |
| 4,938,605 A | 7/1990 | Friedrich |
| 4,941,948 A | 7/1990 | Yamamoto |
| 4,968,463 A | 11/1990 | Levasseur |
| 4,999,390 A | 3/1991 | Bentsen |
| 5,047,455 A | 9/1991 | Hesse et al. |
| 5,053,176 A | 10/1991 | Cameron et al. |
| 5,064,689 A | 11/1991 | Young, Sr. et al. |
| 5,075,057 A | 12/1991 | Hoedl |
| 5,082,605 A | 1/1992 | Brooks et al. |
| 5,084,135 A | 1/1992 | Brooks et al. |
| 5,088,910 A | 2/1992 | Goforth et al. |
| 5,096,046 A | 3/1992 | Goforth et al. |
| 5,096,406 A | 3/1992 | Brooks et al. |
| 5,120,776 A | 6/1992 | Raj et al. |
| 5,164,432 A | 11/1992 | Dehennau et al. |
| 5,173,230 A | 12/1992 | Colombo |
| 5,213,021 A | 5/1993 | Goforth et al. |
| 5,217,655 A | 6/1993 | Schmidt |
| 5,240,656 A | 8/1993 | Scheeres |
| 5,262,108 A * | 11/1993 | Minke et al. ................ 264/163 |
| 5,268,074 A | 12/1993 | Brooks et al. |
| 5,269,991 A | 12/1993 | Gueret |
| 5,277,758 A | 1/1994 | Brooks et al. |
| 5,406,768 A | 4/1995 | Giuseppe et al. |
| 5,413,746 A | 5/1995 | Birjukov |
| 5,416,139 A | 5/1995 | Zeiszler |
| 5,417,904 A | 5/1995 | Razi et al. |
| 5,441,801 A | 8/1995 | Deaner et al. |
| 5,474,722 A | 12/1995 | Woodhams |
| 5,480,602 A | 1/1996 | Nagaich |
| 5,486,553 A | 1/1996 | Deaner et al. |
| 5,497,594 A | 3/1996 | Giuseppe et al. |
| 5,502,088 A | 3/1996 | Hododi |
| 5,516,472 A | 5/1996 | Laver |
| 5,539,027 A | 7/1996 | Deaner et al. |
| 5,540,244 A | 7/1996 | Brooks et al. |
| 5,569,424 A | 10/1996 | Amour |
| 5,585,155 A | 12/1996 | Heikkila et al. |
| 5,603,883 A | 2/1997 | Zikeli |
| 5,620,642 A | 4/1997 | Kamite et al. |
| 5,624,620 A | 4/1997 | Turner |
| 5,652,467 A | 7/1997 | Onose et al. |
| 5,674,442 A | 10/1997 | Morita |
| 5,695,874 A | 12/1997 | Deaner et al. |
| 5,725,939 A | 3/1998 | Nishibori |
| 5,759,680 A | 6/1998 | Brooks et al. |
| 5,773,138 A | 6/1998 | Seethamraju et al. |
| 5,780,519 A | 7/1998 | Imoto |
| 5,783,125 A | 7/1998 | Bastone et al. |
| 5,788,901 A | 8/1998 | Barnard et al. |
| 5,795,641 A | 8/1998 | Pauley et al. |
| 5,827,462 A | 10/1998 | Brandt et al. |
| 5,827,607 A | 10/1998 | Deaner et al. |
| 5,836,128 A | 11/1998 | Groh et al. |
| 5,851,469 A | 12/1998 | Muller et al. |
| 5,866,264 A | 2/1999 | Zehner et al. |
| 5,882,564 A | 3/1999 | Puppin |
| 5,932,334 A * | 8/1999 | Deaner et al. ............ 428/292.4 |
| 5,948,524 A | 9/1999 | Seethamraju et al. |
| 5,972,265 A | 10/1999 | Marra et al. |
| 5,976,435 A | 11/1999 | Djefj et al. |
| 5,981,067 A | 11/1999 | Seethamraju et al. |
| 5,981,631 A | 11/1999 | Ronden et al. |
| 5,985,429 A | 11/1999 | Plummer et al. |
| 6,004,668 A | 12/1999 | Deaner et al. |
| 6,007,656 A | 12/1999 | Heikkila et al. |
| 6,011,091 A | 1/2000 | Zehner |
| 6,015,611 A | 1/2000 | Deaner et al. |
| 6,015,612 A | 1/2000 | Deaner et al. |
| 6,035,588 A | 3/2000 | Zehner et al. |
| 6,054,207 A | 4/2000 | Finley |
| 6,103,791 A | 8/2000 | Zehner |
| 6,106,944 A | 8/2000 | Heikkila et al. |

| | | |
|---|---|---|
| 6,117,924 A | 9/2000 | Brandt |
| 6,122,877 A | 9/2000 | Hendrickson et al. |
| 6,126,883 A | 10/2000 | Troetscher et al. |
| 6,141,874 A | 11/2000 | Olsen |
| 6,149,012 A | 11/2000 | Brooks et al. |
| 6,180,257 B1 | 1/2001 | Brandt et al. |
| 6,207,729 B1 | 3/2001 | Medoff et al. |
| 6,210,792 B1 | 4/2001 | Seethamraju et al. |
| 6,248,813 B1 | 6/2001 | Zehner |
| 6,265,037 B1 | 7/2001 | Godavarti et al. |
| 6,274,248 B1 | 8/2001 | Goto et al. |
| 6,280,667 B1 | 8/2001 | Koenig et al. |
| 6,280,799 B1 | 8/2001 | Okabe et al. |
| 6,322,731 B1 | 11/2001 | Pagden |
| 6,337,138 B1 | 1/2002 | Zehner et al. |
| 6,342,172 B1 | 1/2002 | Finley |
| 6,344,268 B1 | 2/2002 | Stucky et al. |
| 6,344,504 B1 | 2/2002 | Zehner et al. |
| 6,344,509 B1 | 2/2002 | Mizutani |
| 6,357,197 B1 * | 3/2002 | Deaner et al. ............... 52/738.1 |
| 6,376,582 B1 | 4/2002 | Iwata et al. |
| 6,379,815 B1 | 4/2002 | Kusters |
| 6,393,727 B1 | 5/2002 | Seelig et al. |
| 6,409,952 B1 | 6/2002 | Hacker et al. |
| 6,420,034 B1 | 7/2002 | Takahashi et al. |
| 6,453,630 B1 | 9/2002 | Buhrts et al. |
| 6,461,743 B1 | 10/2002 | Tanzer et al. |
| 6,464,913 B1 | 10/2002 | Korney, Jr. |
| 6,468,464 B1 | 10/2002 | Eckardt et al. |
| 6,498,205 B1 | 12/2002 | Zehner |
| 6,511,757 B1 | 1/2003 | Brandt et al. |
| 6,526,712 B2 | 3/2003 | Brooks et al. |
| 6,531,010 B2 | 3/2003 | Puppin |
| 6,569,540 B1 | 5/2003 | Preston et al. |
| 6,578,368 B1 | 6/2003 | Brandt et al. |
| 6,579,605 B2 | 6/2003 | Zehner |
| 6,586,503 B1 | 7/2003 | Grohman |
| 6,586,504 B1 | 7/2003 | Archuletta et al. |
| 6,589,660 B1 | 7/2003 | Templeton et al. |
| 6,590,004 B1 | 7/2003 | Zehner |
| 6,590,014 B2 | 7/2003 | Ruede |
| 6,605,245 B1 | 8/2003 | Dubelstein et al. |
| 6,617,376 B2 | 9/2003 | Korney, Jr. |
| 6,632,863 B2 | 10/2003 | Hutchison et al. |
| 6,637,213 B2 | 10/2003 | Hutchison et al. |
| 6,670,012 B2 * | 12/2003 | Campbell et al. ............. 428/60 |
| 6,680,090 B2 | 1/2004 | Godavarti et al. |
| 6,682,789 B2 | 1/2004 | Godavarti et al. |
| 6,682,814 B2 | 1/2004 | Hendrickson et al. |
| 6,685,858 B2 | 2/2004 | Korney, Jr. |
| 6,708,504 B2 | 3/2004 | Brandt et al. |
| D488,243 S | 4/2004 | Babka et al. |
| 6,718,704 B2 | 4/2004 | Plummer et al. |
| 6,722,082 B1 | 4/2004 | Peterson et al. |
| 6,726,464 B1 | 4/2004 | Kato et al. |
| 6,780,359 B1 | 8/2004 | Zehner et al. |
| 6,865,849 B1 | 3/2005 | Mollinger et al. |
| 6,903,149 B2 * | 6/2005 | Yasuda et al. ................. 524/13 |
| 6,958,185 B1 | 10/2005 | Zehner |
| 6,984,676 B1 | 1/2006 | Brandt |
| 2001/0009309 A1 | 7/2001 | Taguichi et al. |
| 2001/0019749 A1 | 9/2001 | Godavarti |
| 2001/0051242 A1 | 12/2001 | Godavarti |
| 2001/0051243 A1 | 12/2001 | Godavarti |
| 2002/0005602 A1 | 1/2002 | Jacobsen |
| 2002/0033563 A1 | 3/2002 | Gilbert et al. |
| 2002/0049266 A1 | 4/2002 | Yasuda et al. |
| 2002/0091178 A1 | 7/2002 | Amin-Javaheri |
| 2002/0092256 A1 | 7/2002 | Hendrickson et al. |
| 2002/0106498 A1 | 8/2002 | Deaner et al. |
| 2002/0180089 A1 | 12/2002 | Frankefort et al. |
| 2003/0004232 A1 | 1/2003 | Ruede |
| 2003/0021915 A1 | 1/2003 | Rohatge et al. |
| 2003/0025233 A1 | 2/2003 | Korney, jr. |
| 2003/0030176 A1 | 2/2003 | Monovoukas et al. |
| 2003/0032702 A1 | 2/2003 | Medoff et al. |
| 2003/0036589 A1 | 2/2003 | Archuletta et al. |
| 2003/0071389 A1 | 4/2003 | Manning et al. |
| 2003/0087994 A1 | 5/2003 | Frechette |
| 2003/0154662 A1 | 8/2003 | Bruchu et al. |
| 2003/0175447 A1 | 9/2003 | Barchena |
| 2003/0176538 A1 | 9/2003 | Wu et al. |
| 2004/0038002 A1 | 2/2004 | Franco et al. |
| 2005/0053767 A1 | 3/2005 | Franco et al. |

FOREIGN PATENT DOCUMENTS

| | | |
|---|---|---|
| DE | 11 46 648 B | 4/1963 |
| DE | 2305150 | 8/1974 |
| DE | 149481 | 7/1981 |
| EP | 0 031 635 A1 | 7/1981 |
| EP | 0 128 038 A2 | 12/1984 |
| EP | 0 590 748 B1 | 1/1988 |
| EP | 0 259 810 A2 | 3/1988 |
| EP | 0 338 264 A2 | 10/1989 |
| EP | 0 338 264 A3 | 10/1989 |
| EP | 0 338 264 B1 | 10/1989 |
| EP | 0 338 335 A1 | 10/1989 |
| EP | 0 373 729 A2 | 6/1990 |
| EP | 0 390 536 A2 | 10/1990 |
| EP | 0 403 276 A2 | 12/1990 |
| EP | 0 407 996 A2 | 1/1991 |
| EP | 0 259 810 B1 | 3/1991 |
| EP | 0 235 794 B1 | 4/1991 |
| EP | 0 420 256 A2 | 4/1991 |
| EP | 0 421 957 A2 | 4/1991 |
| EP | 0 426 619 A2 | 5/1991 |
| EP | 0 421 957 A3 | 7/1991 |
| EP | 0 438 339 A2 | 7/1991 |
| EP | 0 379 980 B1 | 1/1992 |
| EP | 0 482 270 A1 | 4/1992 |
| EP | 0 496 687 A1 | 7/1992 |
| EP | 0 496 687 B1 | 7/1992 |
| EP | 0 497 335 A2 | 8/1992 |
| EP | 0 521 228 A1 | 1/1993 |
| EP | 0 552 918 A1 | 7/1993 |
| EP | 0 338 264 B1 | 8/1993 |
| EP | 0 585 965 A1 | 3/1994 |
| EP | 0 438 339 B1 | 6/1994 |
| EP | 0 607 968 A1 | 7/1994 |
| EP | 0 388 465 B1 | 8/1994 |
| EP | 0 426 619 B1 | 8/1994 |
| EP | 0 407 996 B1 | 12/1994 |
| EP | 0 639 442 A1 | 2/1995 |
| EP | 0 433 686 B1 | 4/1995 |
| EP | 0 420 256 B1 | 5/1995 |
| EP | 0 655 310 A1 | 5/1995 |
| EP | 0 526 353 B1 | 8/1995 |
| EP | 0 526 353 B1 | 11/1995 |
| EP | 0 679 489 A2 | 11/1995 |
| EP | 0 679 489 A3 | 11/1995 |
| EP | 0 504 002 B1 | 1/1996 |
| EP | 0 483 716 B1 | 7/1996 |
| EP | 0 559 796 B1 | 8/1996 |
| EP | 0 642 905 B1 | 12/1996 |
| EP | 0 599 145 B1 | 1/1997 |
| EP | 0 497 335 B1 | 3/1997 |
| EP | 0 727 299 A3 | 3/1997 |
| EP | 0 512 433 B1 | 7/1997 |
| EP | 0 528 788 B1 | 7/1997 |
| EP | 0 693 025 B1 | 7/1997 |
| EP | 0 747 205 A3 | 7/1997 |
| EP | 0 559 794 B1 | 8/1997 |
| EP | 0 403 276 B1 | 9/1997 |
| EP | 0 611 340 B1 | 10/1997 |
| EP | 0 807 510 A1 | 11/1997 |

| | | | |
|---|---|---|---|
| EP | 0 857 556 A1 | 8/1998 |
| EP | 0 730 521 B1 | 10/1998 |
| EP | 0 878 288 A1 | 11/1998 |
| EP | 0 904 928 A1 | 3/1999 |
| EP | 0 825 921 B1 | 4/1999 |
| EP | 0 913 243 A1 | 5/1999 |
| EP | 0 669 195 B1 | 6/1999 |
| EP | 0 931 635 A1 | 7/1999 |
| EP | 0 607 968 B1 | 9/1999 |
| EP | 0 766 619 B1 | 9/1999 |
| EP | 0 727 299 B1 | 10/1999 |
| EP | 0 655 310 B1 | 12/1999 |
| EP | 0 874 722 B1 | 12/1999 |
| EP | 0 919 357 A3 | 2/2000 |
| EP | 0 982 110 A1 | 3/2000 |
| EP | 0 883 482 B1 | 4/2000 |
| EP | 0 906 480 B1 | 5/2000 |
| EP | 0 810 918 B1 | 7/2001 |
| EP | 0 878 288 B1 | 8/2001 |
| EP | 1 134 069 A1 | 9/2001 |
| EP | 0 807 510 B1 | 2/2002 |
| EP | 0 895 847 B1 | 2/2002 |
| EP | 0 687 538 B1 | 3/2002 |
| EP | 0 963 285 B1 | 4/2002 |
| EP | 1 128 947 B1 | 6/2002 |
| EP | 0 747 205 B1 | 8/2002 |
| EP | 0 804 331 B1 | 8/2002 |
| EP | 1 231 046 A2 | 8/2002 |
| EP | 1 234 652 A1 | 8/2002 |
| EP | 0 679 120 B1 | 10/2002 |
| EP | 1 250 995 A1 | 10/2002 |
| EP | 1 102 667 B1 | 11/2002 |
| EP | 1 123 184 B1 | 12/2002 |
| EP | 0 786 320 B1 | 1/2003 |
| EP | 0 913 243 B1 | 1/2003 |
| EP | 0 831 987 B1 | 3/2003 |
| EP | 1 109 657 B1 | 3/2003 |
| EP | 1 022 111 B1 | 4/2003 |
| EP | 1 304 211 A1 | 4/2003 |
| EP | 0 818 294 B1 | 5/2003 |
| EP | 1 308 259 A2 | 5/2003 |
| EP | 0 927 628 B1 | 6/2003 |
| EP | 1 325 804 A1 | 7/2003 |
| EP | 1 268 164 B1 | 8/2003 |
| EP | 1 154 891 B1 | 9/2003 |
| EP | 1 159 117 B1 | 10/2003 |
| EP | 1 356 916 A1 | 10/2003 |
| EP | 0 979 165 B1 | 3/2004 |
| EP | 1 304 211 B1 | 4/2004 |
| EP | 1 415 792 A2 | 5/2004 |
| GB | 1505833 | 3/1978 |
| JP | S54-034365 A | 3/1979 |
| JP | S54-042470 A | 4/1979 |
| JP | S56-009417 A | 1/1981 |
| JP | S58-147343 A | 9/1983 |
| JP | S58-189231 A | 11/1983 |
| JP | S59-115335 A | 7/1984 |
| JP | S60-058438 A | 4/1985 |
| JP | S61-016965 A | 1/1986 |
| JP | S61-133249 A | 6/1986 |
| JP | S61-171736 A | 8/1986 |
| JP | S61-233061 A | 10/1986 |
| JP | S62-132954 A | 6/1987 |
| JP | S63-006036 A | 1/1988 |
| JP | H01-230672 A | 9/1989 |
| SU | 1537682 A | 1/1990 |
| SU | 1557149 A | 4/1990 |
| WO | WO88/09406 A1 | 12/1988 |
| WO | WO91/17040 A1 | 11/1991 |
| WO | WO95/13179 A1 | 5/1995 |
| WO | WO96/12606 A1 | 5/1996 |
| WO | WO 98/052996 A1 | 11/1998 |
| WO | WO99/06200 A1 | 2/1999 |
| WO | WO 99/028110 A1 | 6/1999 |
| WO | WO 00/46010 A1 | 8/2000 |
| WO | WO 02/102586 A2 | 12/2002 |
| WO | WO 02/103113 A2 | 12/2002 |

OTHER PUBLICATIONS

*Pipe and Tubing Dics*, vol. 9, 9.3.1—Calibrators, pp. 448-450.
*Whittington's Dictionary of Plastics*, Lloyd R. Whittington, p. 154.
*The Encyclopedia of Plastics Equipment*, Herbert R. Simonds (1964), pp. 273-274.
*Plastics Waste—Recovery of Economic Value*, Jacob Leidner (1981) pp. iii, 28-29; 90-91; 148-149.
*Plastics Extrusion Technology Handbook*, Sidney Levy, P.E., (1923) pp. 55, 90-106, 111, 152-153.
*Mobil Oil Corporation v. Advanced Environmental Recycling Technologies, Inc.*; Civil Action No. 92-351-JJF, 869 F. Supp. 251; 1995 U.S. Dist. LEXIS 7108; 32 U.S.P.Q.2D (BNA) 1187.
E.G. Fisher; Extrusion of Plastics; 1976; 300 pages; Third Printing; John Wiley & Sons; New York, Toronto.
"Plastics Scrap Materials: Some Notes on Their Treatment and Use"; Plastics Magazine; p. 285; Aug. 1953.
Herbert R. Simonds, Archie J. Weith, and William Schack; Extrusion of Plastics, Rubber, and Metals; 1952; 257 pages; Fourth Printing; Reinhold Publishing Corporation; New York.
Advanced Environmental Recycling Technologies, Inc.; Annual Report Pursuant To Section 13 or 15(d) of the Securities Exchange Act of 1934; filed Mar. 31, 1993; Annual Report is 66 pages; Additional Information is 98 pages.
K. Berggren, C. Klason, and Prof. J. Kubat; "The Injection Molding of Thermoplastic Materials that Contain Wood Dust"; Kunststoffe; 1975; pp. 69-74; vol. 65, No. 2.
Paul N. Richardson; Introduction to Extrusion; 1974; Seventh Printing; Society of Plastics Engineers, Inc.; Brookfield, CT.
Norbert M. Bikales, EDITOR; Extrusion and Other Plastics Operations; 1971; 428 pages; Wiley-Interscience; New York, London, Sydney, Toronto.
Zehev Tadmor & Imrich Klein; Engineering Principles of Plasticating Extrusion; Van Nostrand Reinhold Company; New York, Cincinnati, Toronto, London, Melbourne.
J.A. Brydson; Plastics Material; Fourth Edition; 1965; 224 pages; Butterworth Scientific; London, Boston, Durban, Singapore, Sydney, Toronto, Wellington.
"Artificial log concern signs pact for 1 of 3 N.J. plants"; Asbury Park Press; Feb. 3, 1987.
Friedrich Hensen, Editor; Plastics Extrusion Technology; pp. 247, 248, 697-702; 1988; Hanser Publishers; Munich, Vienna, New York.
Robert D. Leaversuch; "Industry begins to face up to the crisis of recycling"; Modern Plastics; pp. 44-47; Mar. 1987.
James P. Quaranta; "Hearthbrite to build in Vineland"; Vineland Times Journal; Jan. 30, 1987.
"Trading Opens"; The Sunday Star-Ledger; Jan. 18, 1987.
James Van Horn; "Companies on the Move"; New Jersey Business Journal; p. 86; Mar. 1988.
Hearthbrite Industries, Inc.; Annual Report; 41 pages; 1986.
Daniel H. Newdell; "What's Happening in Profile Downstream Equipment"; Plastics Technology Magazine; pp. 81-83; Oct. 1982.
Chris Rauwendaal; Polymer Extrusion; 1986; pp. 28, 69-71, 168, 169, 426, 427; Hanser Publishers; Munich, Vienna, New York.
Jacob Leidner; Plastics Waste: Recovery of Economic Value; 1981; pp. 28, 29, 90, 91, 148; Marcel Dekker, Inc.; New York and Basel.
K. Yam, V. Kalyankal, S. Selkh, and C. Lai; "Mechanical Properties of Wood Fiber/Recycled HDPE Composites"; The Society of Plastics Engineers' Annual Technical Conference Publication; 1988; pp. 1809-1811.
Susan E. Selke, Kit L. Yam, Binoy Gogoi, Christopher C. Lai; "Compounding Wood Fibers and Recycled High Density Polyethylene Using a Twin-Screw Extruder"; School of Packaging, Michigan State University, East Lansing, MI 48824-1223; 9 pages; presented at meeting of American Chemical Society in Toronto in Jun. 1988.
Susan E. Selke, Kit L. Yam, Christopher C. Lai, Binoy Gogoi, Vasha Kalyankar; "Use of Eastern Hardwoods in Wood Fiber/Plastic Composites"; School of Packaging, Michigan State University, East Lansing, MI 48824-1223; 31 pages; Sep. 15-16, 1988.

Kit L. Yam; "Use of Recycled Plastics in Composite Materials"; School of Packaging, Michigan State University, East Lansing; 10 pages.

Dr. Schenkel Gerhard; Plastics Extrusion Technology and Theory: The Design and Operation of Screw Extruders for Plastics; 1966; 352 pages; American Elsevier Publishing Company Inc.; New York.

Sidney Levy, Editor; Plastics Extrusion Technology Handbook; 1981; pp. 6-8, 25-28, 55, 90-106, 111, 152, 153; First Printing; Industrial Press Inc.; New York.

Sidney Levy and James F. Carley, Editors; Plastics Extrusion Technology Handbook; 1989; pp. 2, 9, 10, 19, 38, 39, 52, 97, 132-136, 138-140, 144, 148, 152, Unknown, 182, 183, 206, 207, 210-212, 215, 363; Second Edition; Industrial Press Inc.; New York.

Advanced Environmental Recycling Technologies, Inc.; "Lifecycle Fiber Encapsulated Composite Building Materials"; 3 pages.

Keyes Fibre Company; Molded Fiber products; 6 pages.

Hearthbrite Industries, Inc.; Firelog, Firelogs, and Firelogs 6-Log Pack; 1 page.

Mobil Chemical Company Composite Products Division; "Timbrex" product; 14 pages.

Timbrex Wood-Polymer Composite Physical & Mechanical Properties; 1 page; Feb. 12, 1993.

Timbrex Wood-Polymer Composite Physical & Mechanical Properties; 1 page; Feb. 1993.

Timbrex Wood-Polymer Composite Physical & Mechanical Properties; 1 page; May 21, 1993.

Trex Wood-Polymer Composite Physical & Mechanical Properties; 1 page; Nov. 1, 1993.

"From Animal Feed to Lumber"; In Business Magazine; Summer 1991; pp. 28-29.

Farrel Company Bulletin 211-A; "Screw-Type Extruding Machines for the Rubber Industry"; USA.

Transcript of Oral Deposition of Philip A. Forgione conducted in Southern Minerals Inc., *Joe G. Brooks, Jim Brooks, and Juniper Products, Inc.* vs. *Philip A. Forgione, Redmar Investors, Inc., Texas Venture Corp., and Hearthbrite Industries, Inc.*; Civil Action No. A-87-CA-118; In the U.S. District Court for the Western District of Texas—Austin Division; Aug. 18 and 19, 1987; pp. 1-5, 104, 105, 260-276; published by Ken Owen & Associates of 1103 Nueces Street, Austin, TX 78701-2169.

Juniper Products Corporation; "Hearthbrite Cedar Firelogs"; 15 pages.

William L. Roberts; "Reclaimed: From a waterfront plant, Riverhead is milling discarded plastics to form a wood-like lumber that's catching on"; Philadelphia Business Journal; Dec. 10-16, 1990; pp. 1, 28; vol. 9, No. 40.

Trex Wood-Polymer Composite Usage Guidelines; 1 page.

Mobil Oil Corporation Material Safety Data Bulletin; Oct. 7, 1993; 4 pages.

Mobil Chemical Company: Composite Products Division; Moving Ahead, Product Information, and Physical Properties; 3 pages.

Rivenite Corporation; Technical Information; 13 pages.

Rivenite Corporation: Better Products Through Recycling; 9 pages.

International Search Report mailed Aug. 5, 2005 in International Application No. PCT/US2005/014198.

"From Animal Feed to Lumber" In Business Magazine; Summer 1991; pp. 28-29.

"Plastics Scrap Materials: Some Notes on Their Treatment and Use", Plastics Magazine, p. 285, Aug. 1953.

* cited by examiner

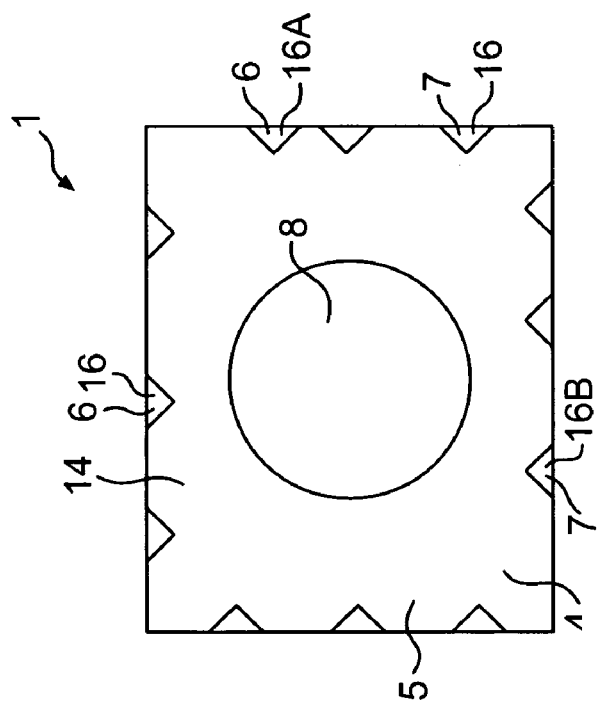
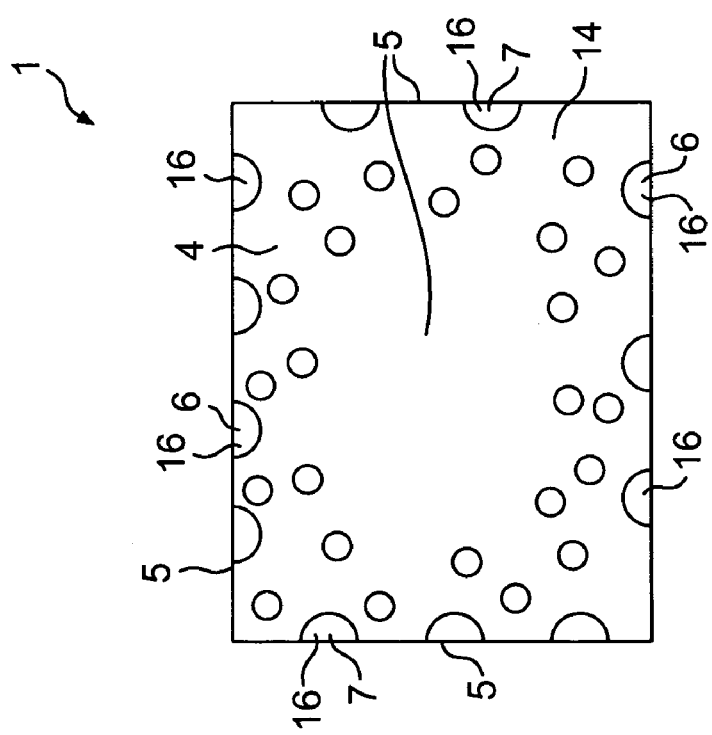
FIG. 3B
FIG. 3A

VARIEGATED COMPOSITES AND RELATED METHODS OF MANUFACTURE

DESCRIPTION OF THE INVENTION

1. Field of the Invention

The invention is directed to variegated wood-plastic composites and methods of manufacturing the same. For example, the surfaces of the wood-plastic composites may be variegated by varying the polymer composition of the wood-plastic composite. The invention also includes a method of manufacturing the wood-plastic composites such that one polymer is shifted in the composite relative to the other polymer.

2. Background of the Invention

Wooden components are commonly used in manufacturing decks and related assemblies. Wooden components includes strings of wood fibers having various colors (e.g., rings on trees) that give the surface of the wooden component a streaked appearance. The streaked appearance imparts an aesthetically pleasing look and feel to the deck component. One disadvantage of using wooden components, however, is that the wood may be susceptible to rotting, weather, insects, and/or wear and tear, and may require the acquisition and processing of wood which may involve environmentally unfriendly processing techniques, such as the clear cutting of forests and the use of hazardous chemicals.

A more environmentally friendly alternative to using wooden components in manufacturing decks and related assemblies is to use a wood-plastic composite made of crystalline polymers. Examples of suitable wood-plastic composites made of crystalline polymers and related methods of manufacture are disclosed in co-owned U.S. Pat. Nos. 5,851,469 and 6,527,532, co-pending and co-owned U.S. patent application Ser. No. 10/292,672 filed Nov. 12, 2002, and co-pending and co-owned U.S. patent application Ser. No. 10/668,368 filed Sep. 24, 2003, the entirety of all of which are incorporated herein by reference.

Wood-plastic composites made of crystalline polymers, however, tend to have solid one color surfaces. This is at least partially due to the sharp melting point temperatures of crystalline polymers and the tendency of crystalline polymers to easily blend together. Thus, even if a plurality of crystalline polymers having a plurality of different colors are used to manufacture a wood-plastic composites, the plurality of different colors will blend together in the manufacturing process and the composite will emerge having a surface with one solid color. In any case, the resultant composite does not have a streaked appearance.

SUMMARY OF THE INVENTION

An exemplary embodiment of the invention includes a composite. The composite comprises a crystalline polymer, a plurality of wood fibers blended with the crystalline polymer, an outer surface, and an amorphous polymer visible on the outer surface. The amorphous polymer has a first color and the blend of the crystalline polymer and the plurality of wood fibers has a second color different from the first color.

In various embodiments, the invention may include one or more of the following aspects: the crystalline polymer may be at least one of polypropylene and polyethylene; the amorphous polymer may be a styrenic polymer; the outer surface may include streaks of the first color; the amorphous polymer may have a melting temperature that is substantially the same as a melting temperature of the crystalline polymer; the outer surface may be variegated; a first portion of the outer surface may have the first color and a second portion of the outer surface may have the second color; another amorphous polymer visible on the outer surface; the another amorphous polymer may have a third color different from the first color and the second color; the composite may be at least one of a building material, a decking material, and a decking board; a colorant may be blended with one of the crystalline polymer and the amorphous polymer.

Another embodiment of the invention includes a composite. The composite may include a first polymer, a plurality of wood fibers blended with the first polymer, an outer surface, and a second polymer configured to resist blending with the first polymer. The composite may be manufactured such that the second polymer is deliberately visible on the outer surface. The blend of the first polymer and the plurality of wood fibers may have a first color and the second polymer may have a second color different from the first color. The second polymer may not be substantially soluble in the first polymer.

In various embodiments, the invention may include one or more of the following aspects: the first polymer may be at least one of polypropylene and polyethylene; the second polymer may be a styrenic polymer; the outer surface may include streaks of the second color; the first polymer may have a melting temperature that is substantially the same as a melting temperature of the second polymer; the outer surface may be variegated; a first portion of the outer surface may have the first color and a second portion of the outer surface has the second color; a third polymer may be configured to resist blending with the first polymer; the composite may be manufactured such that the third polymer is deliberately visible on the outer surface; the third polymer may have a third color different from the first color and the second color; the composite may be at least one of a building material, a decking material, and a decking board; a colorant blended with one of the first polymer and the second polymer.

A further embodiment of the invention may include a method of manufacturing a wood-plastic composite. The method may include providing a crystalline polymer, providing a plurality of wood fibers, providing an amorphous polymer, melting the crystalline polymer, melting the amorphous polymer, mixing the amorphous polymer with the crystalline polymer and the plurality of wood fibers to form a feed, and forming a profile body from the feed, the profile body including an outer surface evincing a first color and a second color different from the first color.

In various embodiments, the invention may include one or more of the following aspects: forming streaks of the first color on the outer surface; forming streaks of the amorphous polymer on the outer surface; shifting the amorphous polymer towards the outer surface; variegating the outer surface; providing at least one of a single screw extruder and a double screw extruder; the step of extruding may include extruding the feed via the at least one of the single-screw extruder and the double screw extruder; the step of mixing may include forming the first color from the amorphous polymer and forming the second color from a blend of the crystalline polymer and the plurality of wood fibers; providing another amorphous polymer; melting the another amorphous polymer; mixing the another amorphous polymer with the amorphous polymer, the crystalline polymer, and the plurality of wood fibers; the step of extruding may include forming the profile body such that the outer surface evinces a third color different from the first color and the second color; providing a core; the step of forming the profile body may include forming the profile body around at least a portion of the core; providing a colorant; blending the colorant with one of the crystalline polymer and the amorphous polymer.

Yet another embodiment of the invention may include a method of manufacturing a wood-plastic composite. The method may include providing a first polymer, providing a plurality of wood fibers, providing a second polymer not substantially soluble in the first polymer, melting the first polymer, melting the second polymer, mixing the second polymer with the first polymer and the plurality of wood fibers to form a feed, and forming a profile body from the feed, the profile body including an outer surface deliberately evincing a first color and a second color different from the first color.

In various embodiments, the invention may include one or more of the following aspects: forming streaks of the first color on the outer surface; forming streaks of the first polymer on the outer surface; shifting the first polymer towards the outer surface; variegating the outer surface; providing at least one of a single screw extruder and a double screw extruder; the step of extruding may include extruding the feed via the at least one of the single-screw extruder and the double screw extruder; the step of mixing may include forming the first color from the first polymer and forming the second color from a blend of the second polymer and the plurality of wood fibers; providing a third polymer not substantially soluble in the first polymer; melting the third polymer; mixing the third polymer with the first polymer, the second polymer, and the plurality of wood fibers; the step of extruding may include forming the profile body such that the outer surface deliberately evinces a third color different from the first color and the second color; providing a core; the step of forming the profile body may include forming the profile body around at least a portion of the core; providing a colorant; blending the colorant with one of the first polymer and the second polymer.

A yet further embodiment of the invention may include a method of manufacturing a wood-plastic composite. The method may include providing a first polymer, a plurality of wood fibers, a second polymer not substantially soluble in the first polymer, and an additive, melting the first polymer and the second polymer, blending the additive with the second polymer to form a blend, mixing the blend with the first polymer and the plurality of wood fibers to form a feed, forming a profile body with an outer surface from the feed, and shifting the blend towards the outer surface such that at least a portion of the blend is visible on the outer surface.

In various embodiments, the invention may include one or more of the following aspects: the additive may be one or more of a pigment, a mold inhibitor, and a mildew inhibitor; the blend may substantially cover an entire side of the profile body; the additive may not be blended with either of the first polymer or the wood fibers; the additive may be soluble in the second polymer and not be soluble in the first polymer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 3A is a side schematic view of the composite of FIG. 1.

FIG. 3B is a side schematic view of a composite according to yet another embodiment of the invention.

DESCRIPTION OF THE EMBODIMENTS

Figure 1:
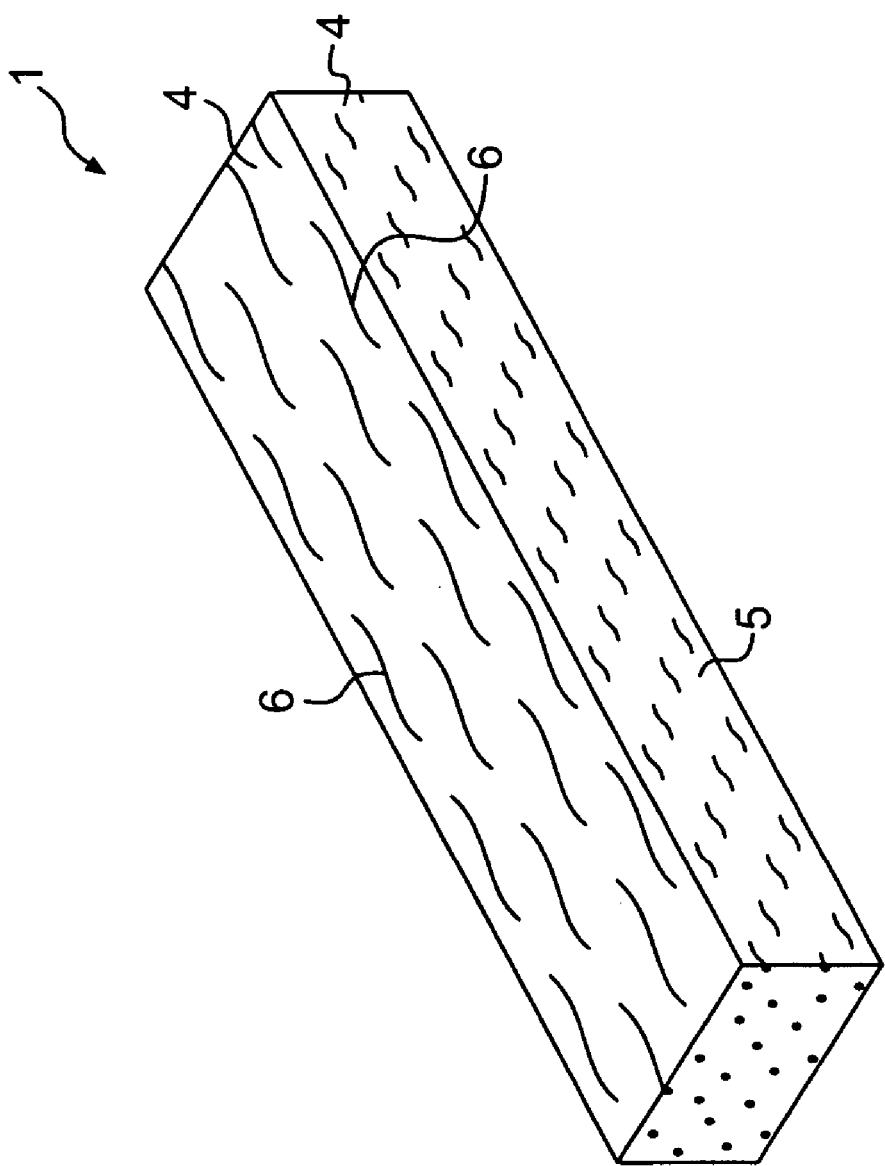
FIG. 1 is a perspective view of a composite according to an embodiment of the invention.
Figure 2C:
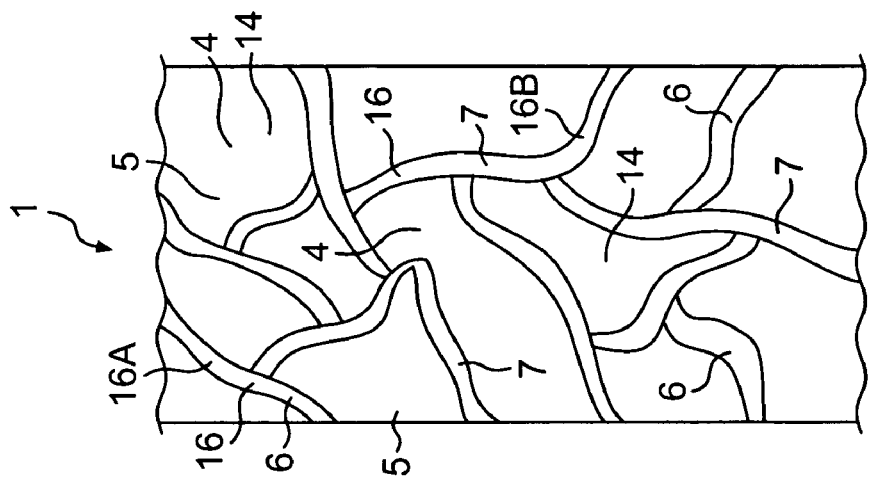
FIG. 2C is a top schematic view of a composite according to a further embodiment of the invention.
Figure 2B:
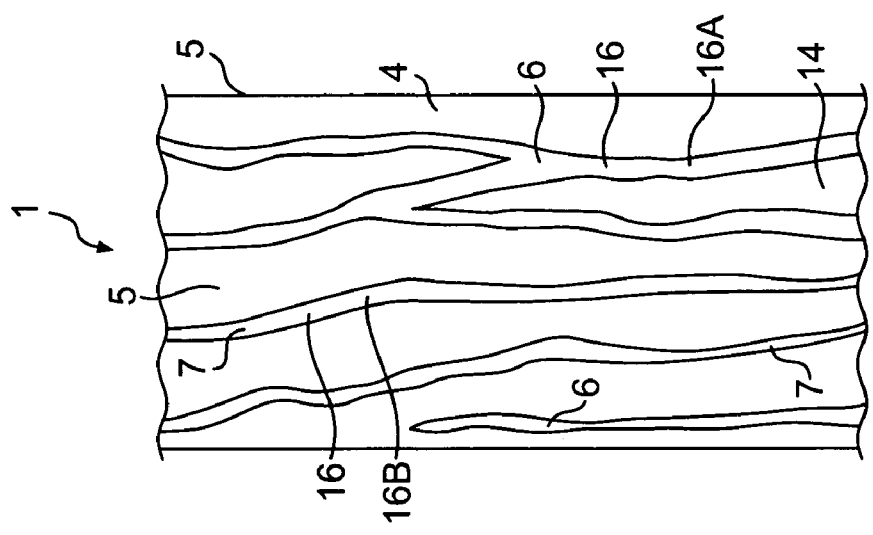
FIG. 2B is a top schematic view of a composite according to another embodiment of the invention.
Figure 2A:
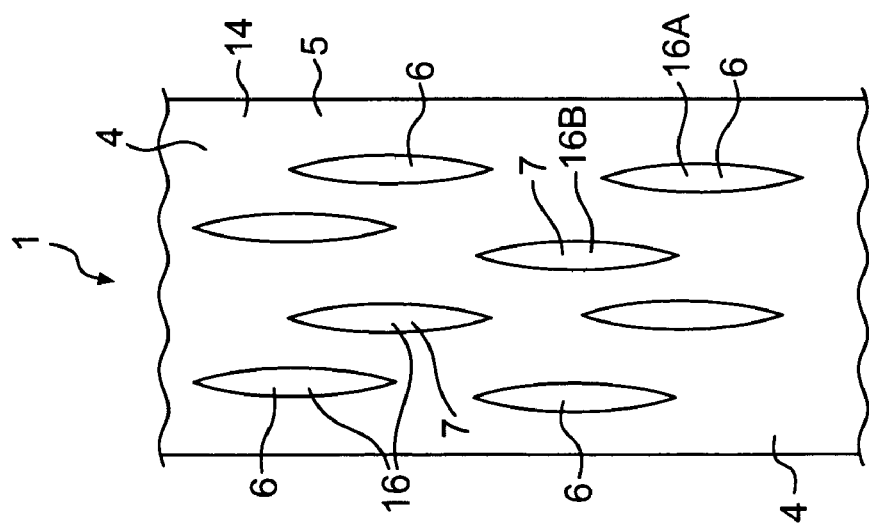
FIG. 2A is a schematic view of the composite of FIG. 1.

Reference will now be made in detail to the exemplary embodiments of the invention, examples of which are illustrated in the accompanying drawings. Wherever possible, the same reference numbers will be used throughout the drawings to refer to the same or like parts.

An exemplary embodiment of the invention includes a composite. As shown in FIGS. 1, 2A-2C, and 3A-3C, composite 1 may include a first polymer 2, a plurality of wood fibers 3 blended with first polymer 2 to form a blend 4, an outer surface 5, and a second polymer 6 configured to resist blending with first polymer 2 (e.g., second polymer 6 is not substantially soluble in first polymer 2). Second polymer 6 may be visible on outer surface 5. Blend 4 of first polymer 2 and wood fibers 3 may have a first color and second polymer 6 may have a second color different from the first color.

Composite 1 may be used as a decking component or any other suitable building material. For example, as shown in FIG. 1, composite 1 may be used as a decking board, railing, railing post, and/or decking beam. In another example, composite 1 may be used to construct any portions of homes, walkways, shelters, and/or any other desirable structure.

Composite 1 may include a first polymer 2 which may be a crystalline polymer 2. Crystalline polymer 2 is preferably at least one of high density polyethylene (HDPE), low density polyethylene (LDPE), linear low density polyethylene (LLDPE), and polypropylene (PP). The polypropylene may be a homo- and/or a co-polymer polypropylene. However, any crystalline polymer may be used, such as one or more polyamides (PA), nylons, polyoxymethylenes, polybutylene terephthalates (PBT), polyethylene terephthalates (PET), and/or acetals. Crystalline polymer 2 may have any suitable size, shape, and/or configuration to be melted, mixed with wood fibers 3, and/or extruded into a dimensionally stable profile. Crystalline polymer 2 may have any suitable size, shape, and/or configuration to be used in any of the apparatuses or methods disclosed in co-owned U.S. Pat. Nos. 5,851,469 and 6,527,532, co-pending and co-owned U.S. patent application Ser. No. 10/292,672 filed Nov. 12, 2002, and co-pending and co-owned U.S. patent application Ser. No. 10/668,368 filed Sep. 24, 2003, the entirety of all of which are incorporated herein by reference. For example, crystalline polymer 2 may be in the form of a pellet, a flake, a film, and/or a scrap form. In another example, crystalline polymer 2 may range in size from reactor powder having a diameter of about 0.01650 inches to pieces of plastic having dimensions (e.g., length, width, height, depth, and/or diameter) between about 1 inch and about 100 feet. More typically, however, crystalline polymer 2 is film scrap having dimensions (e.g., length, width, height, depth, and/or diameter) between about 0.0787 inches and 0.25 inches.

Composite 1 may include a second polymer 6 which may be an amorphous polymer 6. Amorphous polymer 6 is preferably a styrenic polymer such as polystrene (PS). However, any amorphous polymer may be used in composite 1, such as one or more of Impact PS, polymethylmethacrylates (PMMA), polyvinyl chlorides (PVC), acrylonitrile-butadine-styrene copolymers (ABS), thermoplastic polyurethanes (TPU), styrene acrylonitrile copolymers (SAN), polyphenyl oxide (PPO), acryla-styrene butyl-acrylate or acrylate styrene acrylonitrile (either of which may be abbreviated as ASA), and/or polycarbonates (PC). In a preferred embodiment, ABS is used. Amorphous polymer 6 may have any suitable size, shape, and/or configuration. For example, amorphous polymer 6 may be in the form of pellets and/or flakes. In a preferred embodiment, amorphous polymer 6 has a high polarity and/or decreased melt flow relative to crystalline polymer 2. The size of the amorphous polymer 6 used may be dependent on these and other properties of amorphous polymer 6. For example, amorphous polymer 6 may be a substantially solid chunk having dimensions (e.g., length, width, diameter, depth, and/or height) between about 0.25 inches and 0.0165 inches or may have a substantially spherical shape having an average diameter of about 0.0165 inches.

In its solid form, polymers generally are capable of forming different structures depending on the structure of the polymer chain as well as the processing conditions. In amorphous polymers 6, the polymer chain is substantially random and unordered in structure, while in crystalline polymers 2, the structure of the polymer backbone is a substantially regular, ordered structure such that the polymer can be tightly packed, although in general most crystalline polymer 2 are only semicrystalline. This is because the exact make up and details of the polymer backbone will determine whether the polymer is capable of crystallizing. For example, PVC, depending on the characteristics of its backbone, may be either crystalline (isotactic or syndiotactic structures) or amorphous (atactic structure). Accordingly, due to these differences in polymer structures, amorphous polymers 6 generally cannot fit into the semicrystalline structures of crystalline polymers 2 (e.g., like incompatible puzzle pieces), and amorphous polymers 6 may also exhibit polarities that prevent it from being integrated into the semicrystalline structures of crystalline polymers 2 (e.g., like oil and water). Thus, amorphous polymer 6 has a different solubility parameter then crystalline polymer 2. The polarities of amorphous polymer 6 may also allow it to retain polar pigments (e.g., which may be background color 9) that may not bind as well to crystalline polymer 2 which is either devoid and/or has a lower polarity than amorphous polymer 6.

Composite 1 may include a plurality of wood fibers 3. Wood fibers 3 may be from any type of suitable wood, for example, one or more hardwoods and/or softwoods. Wood fibers 3 may be of any suitable shape and/or size, and may be configured to be suitably blended with crystalline polymer 2 such that a mixture or blend 4 of wood fibers 3 and crystalline polymer 2 appears substantially homogenous in color and/or consistency. For example, wood fibers 3 may have dimensions (e.g., length, width, depth, diameter, and/or height) ranging from about 6 inches to about 0.25 inches, all the way down to substantially spherical shapes having an average diameter of about 0.00079 inches. More typically, however, wood fibers 3 may range in size from substantially spherical shapes having an average diameter of about 0.07870 inches to substantially spherical shapes having an average diameter of about 0.007 inches. In various embodiments, the wood fibers 3 may be mixed with and/or be replaced with any suitable organic or inorganic filler material, including one or more of grass, wheat hulls, corn stocks, corn ears, nuts, nut shells, peanuts, peanut shells, walnut, walnut shells, sand, clay, dirt, and concrete.

Second polymer 6 may resist blending with first polymer 2 (e.g., second polymer 6 may not be soluble in first polymer 2 and vice versa). For example, if second polymer 6 is an amorphous polymer and first polymer 2 is a crystalline polymer, even when both polymers are in a melted state, the two polymers may resist blending with each other. Thus, while amorphous polymer 6 may be somewhat dispersed throughout crystalline polymer 2, amorphous polymer 6 may not be evenly distributed or blended throughout crystalline polymer 2 (e.g., amorphous polymer 6 may migrate to the outer surface 5). Accordingly, amorphous polymer 6 may form "clumps" and/or "pockets" in crystalline polymer 2, and thus regions of amorphous polymer 6 may be clearly discernible in the otherwise substantially homogenous blend of crystalline polymer 2 and wood fibers 3. For example, amorphous polymer 6 may have a different color and/or consistency than any combination of crystalline polymer 2 and wood fibers 3.

Composite 1 may have a variegated outer surface 5 (i.e., a first portion of outer surface 5 may have a first color and a second portion of outer surface 5 may have a second color different from the first color). For example, outer surface 5 may include streaks 16. Streaks 16 may run in any direction, may have any size and/or shape, may be disposed in and/or on any portion of composite 1, may have any configuration, and/or may have a color different from the rest of composite 1. For example, streaks 16 may assist composite 1 in obtaining a more aesthetically pleasing wood-like appearance. Streaks 16 are preferably present toward outer surface 5. Any surface of composite 1, for example inner surfaces of composite 1, may have streaks 16.

Due to the properties of the amorphous polymer 6 set forth above, and especially with regard to its possible tendency to resist blending with crystalline polymers, amorphous polymer 6 may be responsible for streaks 16 on outer surface 5 of composite 1. For example, when melted and mixed with crystalline polymer 2 and wood fiber blend, amorphous polymer 6 may be dispersed in the blend (e.g., mixed but not blended with the blend) such that streaks 16 correspond to the location of amorphous polymer 6. As shown in FIG. 3A, amorphous polymer 6 is preferably disposed toward outer surface 5 of composite 1.

Figure 3C:
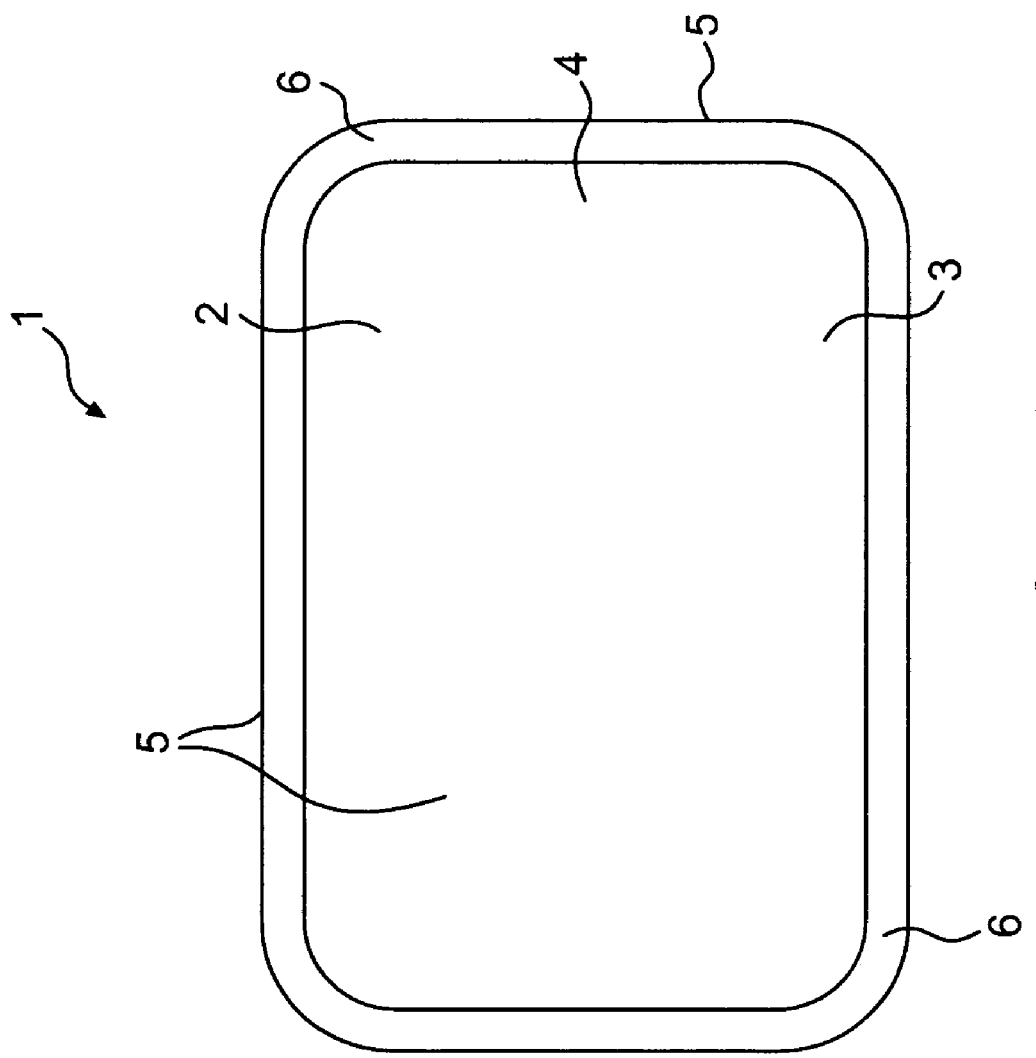
FIG. 3C is a side schematic view of a composite according to still another embodiment of the invention.

Composite 1 may have an outer surface 5 that includes 50% or more of second polymer 6 (e.g., more than 50% of the surface area of outer surface 5 of composite 1 may be second polymer 6). For example, as shown in FIG. 3C substantially entire portions of outer surface 5 (e.g., one or more of the top, bottom, sides, and/or ends of composite 1) may be composed of second polymer 6. Thus, in some configurations, composite 1 may appear as is if it was coextruded such that second polymer 6 substantially surrounds first polymer 2. In such a configuration, entire portions of outer surface 5 may appear to have substantially one color (e.g., the color of second polymer 6 after it has been extruded using any of the exemplary methods set forth herein), even though composite 1 may include one or more components (e.g., first polymer 2, wood fibers 3, blend 4, second polymer 6, background color 9, and/or blend 18) having different colors either prior to, during, or following processing.

Amorphous polymer 6 may have a melting temperature that is substantially the same as a melting temperature of crystalline polymer 2, as shown in the following table:

| Polymer | Melting Temperature Range (° C.) |
|---|---|
| HDPE | 125°–132° |
| LLDPE | 110°–125° |
| LDPE | 103°–110° |
| PP-Homo | 160°–175° |
| PP-Copolymer | 150°–175° |
| PS | 74°–105° |
| ABS | 88°–125° |
| SAN | 100°–200° |
| PS - Rubber Mod. | 93°–105° |

Thus, for polymers listed above, non-melting mixing (e.g., mixing without blending) of amorphous polymer 6 and crystalline polymer 2 may occur between about 140° C. and about 180° C., depending on the exact polymers used. Thus, the present invention has the advantage that even though the polymers used (e.g., crystalline polymer 2 and amorphous polymer 6) may have substantially the same melting temperature, the two polymers will still resist blending.

Composite 1 may include a third polymer 7. For example, third polymer 7 may be an amorphous polymer. Third polymer 7 may be the same amorphous polymer as second polymer 6, or may be a different amorphous polymer. Third polymer 7 may have the same color as second polymer 6, or may have a different color. Third polymer 7 may behave similarly to second polymer 6. For example, third polymer 7 may form streaks 16 on outer surface 5 of composite 1 that have a color different from the rest of outer surface 5. Thus, composite 1 may have a plurality of streaks against a base background color of composite 1, with a first set 16A of streaks 16 having a first color and second set 16B of streaks 16 having a second color different from the first color. One of ordinary skill in the art would realize that composite 1 may include any suitable number of crystalline polymers, wood fiber types, and/or amorphous polymers. In the example where amorphous polymers cover substantially entire portions of composite 1 (e.g., as set forth in FIG. 3C), composite 1 may still evince more than color, for example, one color may correspond to the presence of amorphous polymer 6 on some portions of outer surface 5 while another color may correspond to the presence of amorphous polymer 7 on other portions of outer surface 5.

As shown in FIG. 3B, composite 1 may include a core 8. Core 8 may have any suitable size, shape, configuration, and/or composition. Core 8 may be configured to impart strength or any other suitable property to composite 1. Core 8 may itself be a wood-plastic composite. The mixture of crystalline polymer 2, amorphous polymer 6, and/or wood fibers 3 may be disposed around core 8 and/or integrated (e.g., fused) with core 8.

Composite 1 may include a background color 9 and/or pigment. Background color 9 may be configured to color one or more of crystalline polymer 2, amorphous polymer 6, amorphous polymer 7, and/or wood fibers 3. For example, background color 9 may be processed with crystalline polymer 2 and/or wood fiber 3 such that background color 9 permeates crystalline polymer 2 and/or wood fiber 3 and forms blend 4 (e.g., background color 9 may permeate associate/engage with portions of the polymer chain of crystalline polymer 2). However, blend 4 may then be processed with amorphous polymer 6 in a suitable manner such that background color 9 does not substantially permeate amorphous polymer 6. For example, the processing of blend 4 and amorphous polymer 6 may occur at a lower temperature than the processing of background color 9, crystalline polymer 2, and/or wood fiber 3. In another example, the aforementioned structures of the respective polymer chains of crystalline polymer 2 and amorphous polymer 6 may be substantially incompatible and/or resistant to blending (e.g., at any temperature). Accordingly, background color 9 may substantially remain attached to/within crystalline polymer 2 and/or blend 4 and not appreciably permeate amorphous polymer 6.

In various embodiments, background color 9 may be added to amorphous polymer 6 in addition to and/or instead of crystalline polymer 2, and any of the aforementioned characteristics may be applicable to amorphous polymer 6 (e.g., because amorphous polymer 6 and crystalline polymer 2 are configured to resist blending, background color 9 will substantially remain associated with amorphous polymer 6 and not crystalline polymer 2). Indeed, adding background color 9 to amorphous polymer 6 and then mixing amorphous polymer 6 (which already has been mixed with background color 9) with either a colored or uncolored blend 4 is the preferred embodiment. Background color 9 may have a polarity that increases the likelihood that background color 9 will remain associated with amorphous polymer 6 (e.g., background color 9 and amorphous polymer 6 may have polarities that may cause them to be attracted to each other like magnets with opposing polarities) and not become associated with crystalline polymer 2 (e.g., background color 9 and crystalline polymer 2 may have polarities that may cause them to repel each other like magnets with substantially the same polarities).

In another embodiment, composite 1 may include another material, compound, and/or additive intermixed with at least one of crystalline polymer 2 and amorphous polymer 6, for example, in substantially the same way as background color 9 is intermixed with at least one of crystalline polymer 2 and amorphous polymer 6 as set forth herein, and especially in the previous paragraph. For example, the another material may include a compound that, either on its own or when mixed with at least one of crystalline polymer 2 and amorphous polymer 6, causes at least portions of composite 1 (and preferably outer surface 5 of composite 1) to be resistant to molding and/or mildewing (e.g., keeps the level of microorganisms, mildew, and/or mold in and/or on a composite 1 lower than about 0.1 parts per million). An example of such a material may include a dichloro-octyl-isothiazolone (DCOIT) biostabilizer (e.g., biocide), such as certain grades of VINYZENE™ manufactured by ROHM AND HMS™ (or other isothiazolones), however, any other suitable material (e.g., biostabiliter or biocide) that prevents and/or reduces molding and/or mildewing either alone or when mixed with at least one of crystalline polymer 2 and amorphous polymer 6 is also acceptable. Examples of acceptable methods for determining whether a particular material (e.g., biostabilizer, biocide) suitably prevents and/or reduces mold and/or mildew on composite 1 may include American Association for Testing Materials (ASTM™) standards ASTM™ D-1413-99 SOIL-BLACK, ASTM™ D-4445-91 SAP STAIN, ASTM™ E-1428-99 PINK STAIN, ASTM™ G-21-96 MIXED FUNGI, ASTM™ D-5583-00 SINGLE CULTURE, and/or MILITARY STANDARD 810-E HUMIDITY CHAMBER, and/or their equivalents. Indeed, in any of the embodiments set forth herein, the another material, such as the DCOIT biostabilizer, may be substituted for background color 9 and may exhibit any of the properties of background color 9 relative to the crystalline polymer 2, amorphous polymer 6, and/or blend 4 in any portion of the process.

The DCOIT biostabilizer (examples of which may include VINYZENE™ IT 4000 Series, VINYZENE™ IT 4010 Series, and VINYZENE™ SB 27, all of which are manufactured by ROHM AND HAAS™) may be dispersed throughout the crystalline polymer 2, but preferably the amorphous polymer 6, in any concentration suitable to prevent or reduce mold or mildew growth on the composite 1, for example, between about 800 parts per million and about 2000 parts per million and/or between about 1000 parts per million and 1200 parts per million. The DCOIT biostabilizer may have a thermal stability of about 220° C. and/or a solubility in water of about 6 parts per million.

Another example of a suitable biostabilizer may be 10.10'-oxybisphenoxarsine (OBPA), examples of which may include VINYZENE™ BP 5-2 Series, VINYZENE™ BP 5-5 Series, VINYZENE™ SB 1, and VINYZENE™ SB 1 Series. The OBPA biostabilizer may be dispersed throughout the crystalline polymer 2, but preferably the amorphous polymer 6, in any concentration suitable to prevent or reduce mold or mildew growth on the composite 1, for example, between about 200 parts and about 500 parts per million. The OBPA biostabilizer may have a thermal stability of about 300° C. and/or a solubility in water of about 6 parts per million.

A further example of a suitable biostabilizer may be octyl-isothiazoline (OIT), examples of which may include VINYZENE™ IT 3000 Series, VINYZENE™ IT 3010 Series, VINYZENE™ IT 3025 DIDP, and VINYZENE™ SB 8. The OIT biostabilizer may be dispersed throughout the crystalline polymer 2, but preferably the amorphous polymer 6, in any concentration suitable to prevent or reduce mold or mildew growth on the composite 1, for example, between about 800 parts per million and about 1200 parts per million. The OIT biostabilizer may have a thermal stability of about 220° C. and/or a solubility in water of about 500 parts per million.

Yet another example of a suitable biostabilizer may be trichlorophenoxyphenol (TCPP), examples of which may include VINYZENE™ SB 30. The TCPP biostabilizer may be dispersed throughout the crystalline polymer 2, but preferably the amorphous polymer 6, in any concentration suitable to prevent or reduce mold or mildew growth on the composite 1, for example, between about 800 parts per million and about 1200 parts per million. The TCPP biostabilizer may have a thermal stability of about 230° C. and/or a solubility in water of about 10 parts per million.

A yet further example of a suitable biostabilizer includes biostabilizers that prevent and/or reduce the growth of any of the following exemplary fungi, bacteria, and/or actinomycetes on composite 1: *Alternaria, Aureobasidium, Curvularia, Aspergillus, Penicillium, Fusarium, Bigrospora, Chaetomium, Gliocladium, Helminthsporium*, and/or all of the subspecies of the aforementioned fungi, bacteria, and/or actinomycetes.

Still another example of a suitable biostabilizer (e.g., biocide) includes biostabilizers having one or more of the following features: substantially non-toxic; safe and environmentally friendly; broad spectrum; compatibility with formulation; leach and ultraviolet resistant; has sufficient thermal stability; and ease of use and handling.

A still further example of a suitable biostabilizer may include zinc borate, which may be in the form of a crystalline powder having a solubility in water of about 2800 parts per million and a particle sizes between about 1-2 microns.

Other examples of suitable biostabilizers (e.g., biocides) and methods for determining suitable biostabilizers for wood-plastic and other composites were disclosed in a presentation entitled *Maintaining the Aesthetic Quality of WPC Decking with Isothiazolone Biocide* by Peter Dylingowski, which was presented on May 20, 2003 at the 7th International Conference on Wood-Fiber Plastic Composites, the entirety of which is incorporated herein by reference.

Figure 4A:
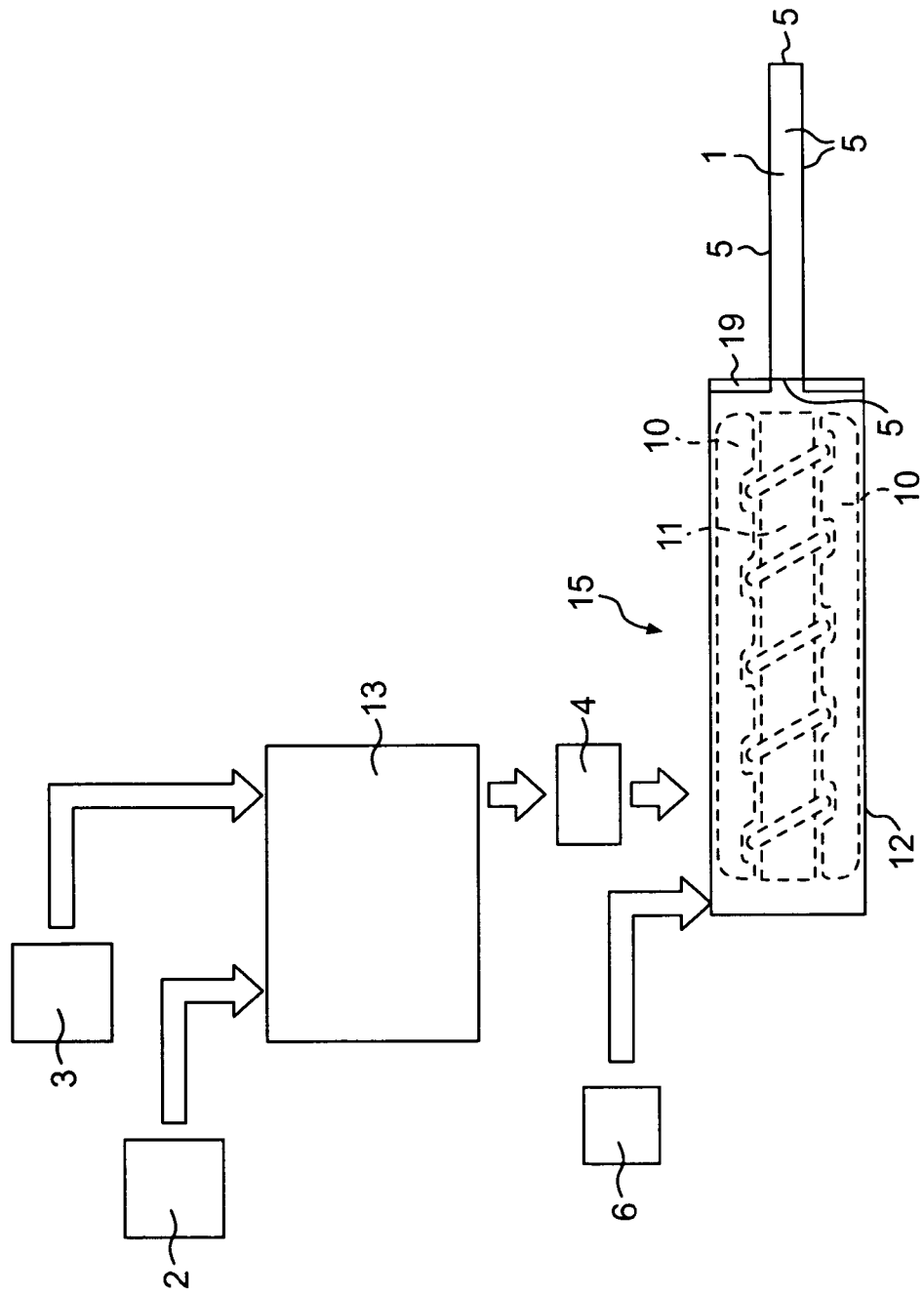
FIG. 4A is a schematic view of a process of manufacturing the composite of FIG. 1.
Figure 4B:
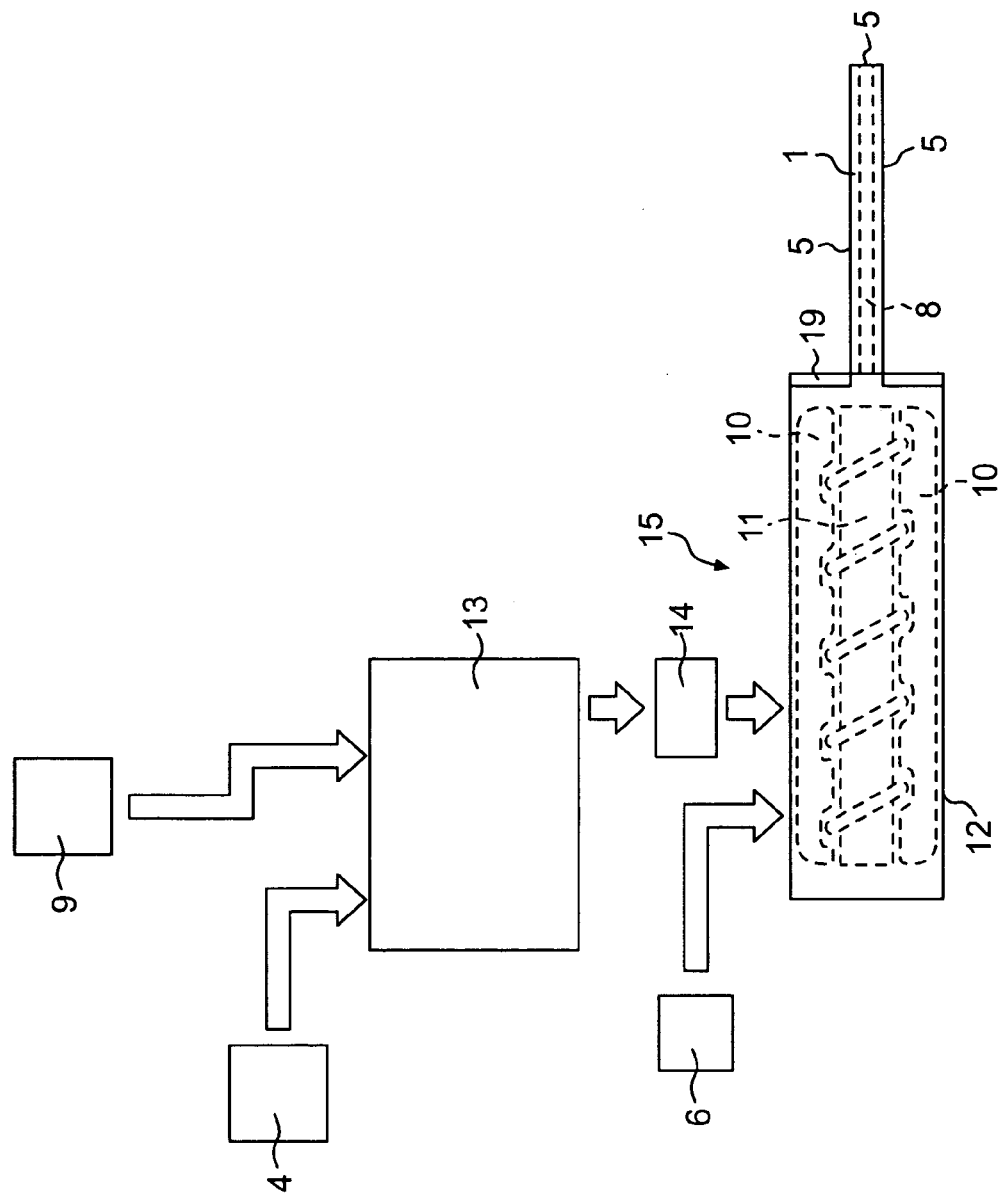
FIG. 4B is a schematic view of a process of manufacturing a composite according to a yet further embodiment of the invention.
Figure 4C:
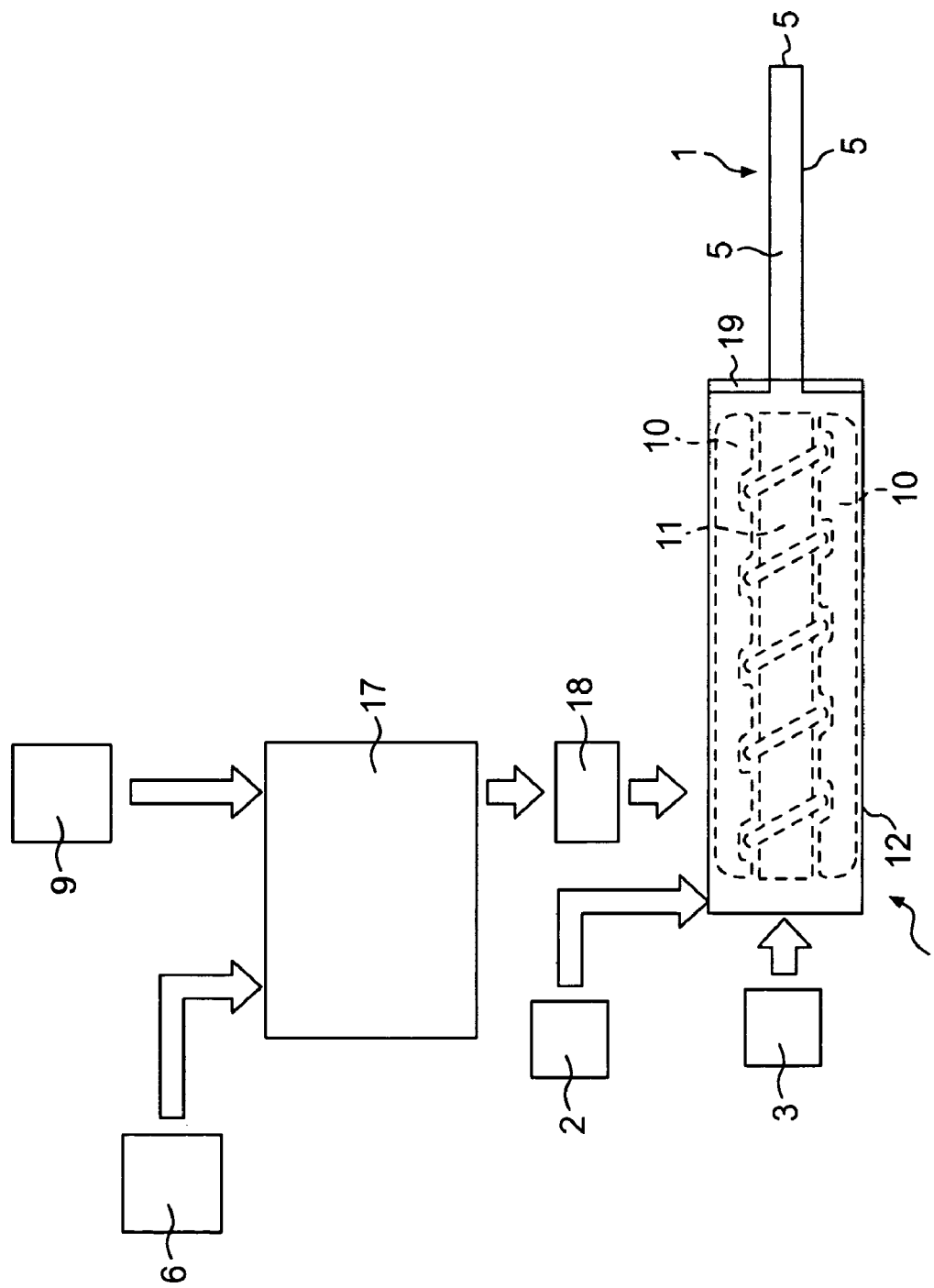
FIG. 4C is a schematic view of a process of manufacturing a composite according to still another embodiment of the invention.

An exemplary embodiment of the invention includes a method of manufacturing a wood-plastic composite. As shown in FIGS. 4A-4C, the method may include providing a first polymer 2, providing a plurality of wood fibers 3, providing a second polymer 6 configured to resist blending with first polymer 2, melting first polymer 2, melting second polymer 6, mixing second polymer 6 with first polymer 2 and wood fibers 3 to form a feed 10, and forming a profile body 1. Profile body 1 may include an outer surface 5 deliberately evincing a first color and a second color different from the first color. Profile body 1 may also include an outer surface 5 being substantially composed of second polymer 6, with a cross-sectional profile of profile body 1 showing that a layer of second polymer 6 may be substantially disposed around blend 4 of first polymer 2 and wood fibers 3.

First polymer 2 may include a crystalline polymer 2. Crystalline polymer 2 is preferably at least one of high density polyethylene (HDPE), low density polyethylene (LDPE), linear low density polyethylene (LLDPE), and polypropylene (PP), however, any crystalline polymer may be used in composite 1, such as one or more polyamides (PA), nylons, polyoxymethylenes, polybutylene terephthalates (PBT), polyethylene terephthalates (PET), and/or acetals. First polymer 2 may be provided in any suitable form (e.g., pellets, flakes, sheets, etc.) to be melted, mixed with wood fibers 3, and/or extruded into a dimensionally stable profile. First polymer 2 may have any suitable size, shape, and/or configuration to be used in any of the apparatuses or methods disclosed in co-owned U.S. Pat. Nos. 5, 851, 469 and 6, 527, 532, co-pending and co-owned U.S. patent application Ser. No. 10/292, 672 filed Nov. 12, 2002, and co-pending and co-owned U.S. patent application Ser. No. 10/668, 368 filed Sep. 24, 2003, the entirety of all of which are incorporated herein by reference. First polymer 2 may be processed prior to extruding the feed 10 using any suitable method. For example, first polymer 2 may be chopped, purified, shredded, heated, and/or demoistured. In various embodiments, first polymer 2 may be heated (e.g., by shear friction with the apparatus or by the application of external thermal energy) to completely melt, partially melt, and/or improve processability.

Crystalline polymers 2 may be selected because they have a specific color (e.g., be mixed with a certain color dye) and/or composition (e.g., allows background color 9 to suitable permeate its structure). However, because crystalline polymers 2 (and/or its additives such as background color 9) tend to blend and form a substantially homogenous color, the specific colors and/or compositions of crystalline polymers 2 used in the process need not be tightly controlled. Some specific dyes may affect the resulting color of profile body 1 more than other dyes. One of ordinary skill in the art may control crystalline polymers 2 input into the process in order to achieve the desired resultant color for outer surface 5. Moreover, the resultant color of crystalline polymers 2 after processing (e.g., heating and/or extrusion) may be different from the initial colors of crystalline polymers 2. Crystalline polymer 2 may have any suitable size, shape, and/or configuration, exemplary parameters for which have already been set forth herein.

Second polymer 6 may include an amorphous polymer. Amorphous polymer 6 is preferably a styrenic polymer such as polystrene (PS), however, any amorphous polymer may be used in composite 1, such as one or more of Impact PS, polymethylmethacrylates (PMMA), polyvinyl chlorides (PVC), acrylonitrile-butadine-styrene copolymers (ABS), thermoplastic polyurethanes (TPU), styrene acrylonitrile copolymers (SAN), polyphenyl oxide (PPO), acryla-styrene butyl-acrylate or acrylate styrene acrylonitrile (either of which may be abbreviated as ASA), and/or polycarbonates (PC). Second polymer 6 may be provided in any suitable form (e.g., pellets, flakes, sheets, films, etc.) Second polymer 6 may be processed prior to extruding the feed 10 using any suitable method. For example, second polymer 6 may be chopped, shredded, heated, purified, and/or demoistured. In another example, background color may be added to second polymer 6, and then second polymer 6 may introduced into a processing apparatus, such as extruder 15, substantially cold (e.g., without processing) to be mixed with blend 4 and/or into the processing apparatus as close to the extruder die 19 of the processing apparatus as possible to be extruded with blend 4.

Amorphous polymer 6 used may be selected based on its color and/or composition. Amorphous polymer 6 may have an initial color and/or resultant color that is different from the initial color and/or resultant color of the one or more crystalline polymers (with or without wood fibers 3) that amorphous polymer 6 is being mixed with. For example, crystalline polymers 2, after processing (with or without wood fibers 3 and/or background color 9), may result in a substantially gray color, while amorphous polymer 6, after processing, may result in a substantially black color. Amorphous polymer 6 may have any suitable size, shape, and/or configuration. For example, amorphous polymer 6 may be provided in flake or pellet form.

Crystalline polymer 2 and/or amorphous polymer 6 may be melted using any suitable method. For example, crystalline polymer 2 and/or amorphous polymer 6 may be heated using in an external heat source (e.g., a flame in a heater 13) or may be heated through kinetic energy (e.g., by passing through a barrel 12 with a rotating screw 11, or passing through extruder die 19). Crystalline polymer 2 and/or amorphous polymer 6 may be melted at any point in the composite manufacturing process prior to forming profile body 1. Crystalline polymer 2 and/or amorphous polymer 6 may be heated separately and/or together. In a preferred embodiment, crystalline polymer 2 and/or wood-fibers 3 may be heated and blended to form blend 4. Crystalline polymer 2 may be heated substantially throughout crystalline polymer 2 and/or enough to improve processability (e.g., mixing and/or blending).

Wood fibers 3 may be from any type of suitable wood, for example, one or more hardwoods and/or softwoods. Wood fibers 3 may also be mixed with and/or replaced by any organic or inorganic filler such as those set forth herein. Wood fibers 3 may be of any suitable shape and/or size, and may be configured to be suitably blended with crystalline polymer 2 such that a mixture of wood fibers 3 and crystalline polymer 2 appears substantially homogenous in color. Wood fibers 3 may be processed prior to forming profile body 1 using any suitable method. For example, wood fibers 3 may be chopped, shredded, heated, purified, and/or demoisturized. Wood fibers 3 may be dried prior to being blended with crystalline polymer 2 to form blend 4. In some cases, pieces of wood fiber 3 may be discernible in blend 4, however, wood fiber 3 will still typically have the same homogenous color as the rest of blend 4.

Crystalline polymer 2 may be blended in a processor 13 with wood fibers 3 such that blend 4 is substantially homogenous. For example, blend 4 may have one substantially solid color and/or have a substantially uniform consistency. Blend 4 may be formed using any suitable method. Crystalline polymer 2 and wood fibers 3 may be blended by placing them together either before, during, or after crystalline polymer 2 and/or wood fibers 3 are dried. Crystalline polymer 2 and wood fibers 3 may be blended using applied heat and/or mechanical agitation. Such blending may be accomplished by an extruder, high shear device, and/or a low shear mixer with or without the application of heat.

Second polymer 6 may be mixed with first polymer 2 and wood fibers 3 to form a feed 10 in any suitable order, any suitable ratio, and using any suitable method. For example, first polymer 2, second polymer 6, and plurality of wood fibers 3 may be mixed as they are advanced by one or more screws 11 in a barrel 12 and/or extruded through die 19. Second polymer 6 may be mixed with first polymer 2 and wood fibers 3 at any time prior to extruding the feed and in any relative order. For example, first polymer 2 may be blended with wood fibers 3, the blend may be heated, and then second polymer 6 may be added to the blend. In another example, first polymer 2, second polymer 6, and wood fibers 3 may be combined at substantially the same time and mixed simultaneously. Second polymer 6 may be mixed with first polymer 2 and wood fibers 3 such that the mixture does not blend. For example, the mixture may be heated to a temperature that allows mixing but not blending.

In another example, second polymer 6 may be added to blend 4 to form feed 10 just prior to extruding feed 10 through extruder die 19. Thus, heating of second polymer 6 may only occur just after introducing second polymer 6 into blend 4 and/or during extrusion of feed 10 through extruder die 19. Accordingly, second polymer 6 may experience less of a heat history than any of first polymer 2, wood fibers 3, and/or blend 4, which may assist in preventing blending.

In a further example, the structures (e.g., crystalline structures, lack of crystalline structures, polymer backbones, polarity, compositions, etc.) of first polymer 2 and second polymer 6 may assist in preventing the polymers 2, 6, from substantially blending. Exemplary percentages of first polymer 2, second polymer 6, and wood fibers 3 are listed herein, however, generally, the percentage of first polymer 2 will exceed the percentage of second polymer 6.

In various embodiments, composite 1 may include between about 100% and about 20% of crystalline polymer 2, between about 5% and about 0% of amorphous polymer 6, and between about 0% and about 80% wood fiber or other filler. In a preferred embodiment, composite 1 may include between about 60% and about 53% of crystalline polymer 2, about 2% of amorphous polymer 6, and between about 45% and about 38% wood fiber or other filler Besides having a more natural, smooth, non-monolithic, and/or three-dimensional looking surface, composites 1 discussed herein may have other advantages. For example, composite 1 may be less susceptible to mold and mildew and/or may be more durable. Crystalline polymer 2 and amorphous polymer 6 do not blend in composites 1. Accordingly, the minor component (in this case, amorphous polymer 6) may migrate to the outer surface 5 of composite 1. When the minor component migrates to outer surface 5 of composite 1, the minor component may tend to coat at least portions of outer surface 5 (e.g., top, bottom, and/or side surfaces) with a polymer rich coating that does not absorb moisture, and thus allows outer surface 5 to resist molding and/or mildewing. Moreover, additional additives, such as mold and mildew resistant compounds (e.g., DCOIT biostabilizers or other suitable anti-fungi.bacteria materials/compounds, examples of which are set forth herein, or other materials having other desirable properties for composite 1), may be added to amorphous polymer 6 at any point before or during the manufacturing process of composite 1. During the addition of the additive to amorphous polymer 6, the additive and amorphous polymer 6 may be processed so as to substantially disperse the additive through the matrix of amorphous polymer 6. Once again, because amorphous polymer 6 may migrate to outer surface 5 of composite 1, amorphous polymer 6 with mildew resistant additives (or other materials) may coat at least portions of outer surface 5. Some exemplary reasons why amorphous polymer 6 may migrate toward outer surface 5 of composite 1 are set forth herein, and especially below.

This type of delivery of the mold and mildew resistant materials and/or compounds, examples of which are set forth herein, (or other compounds with other desirable properties) to specific portions of composite 1 may have many advantages. For example, the compounds themselves may be relatively expensive and/or including too much of the compound in composite 1 may compromise some structural and/or aesthetic properties of composite 1. Thus, there may be a need to minimize the amount of the compound in composite 1 by delivering the compound to portions of the composite 1 where the compound may be most effective. In the case of mildew and/or mold resistant compounds (examples of which are set forth herein), such compounds may be most effective on at least portions of outer surface 5 of composite 1. Accordingly, because the properties (e.g., crystalline structure, solubility, or other properties like or similar to those set forth herein) of first polymer 2 (e.g., crystalline polymer) and second polymer 6 (e.g., amorphous polymer) causes second polymer 6, when extruded, to migrate away from first polymer 2 (e.g., with or without wood fibers 3) and/or toward outer surface 5 of composite 1, second polymer 6 may be used as a vehicle to deliver desirable compounds on and/or toward outer surface 5. In some cases, if the property of the compound is desirable along large portions of outer surface 5, then second polymer 6 with the desirable compound may be disposed along entire portions of outer surface 5, for example, as set forth in FIG. 3C.

Profile body 1 with an outer surface 5 may be formed using any suitable method. For example, the mixture including first polymer 2 (e.g., crystalline polymer), second polymer 6 (e.g., amorphous polymer), and wood fibers 3 may be extruded through a die 19 to form profile body 1. Feed 10 may be extruded using either a single screw extruder or a double screw extruder to form profile body 1. Feed 10 may also be formed into profile body 1 using any suitable method.

Outer surface 5 of profile body 1 may be variegated. Streaks 16 may be formed on outer surface 5 of profile body 1. For example, if crystalline polymer 2 and amorphous polymer 6 are mixed, the chemical properties of the two polymers and/or the processing conditions (e.g., temperature, extrusion rate, mixing rate that the two polymers are subjected to) may prevent them from blending with each other and forming a homogenous color. Accordingly, "clumps" or "pockets" of amorphous polymer 6 may be dispersed through crystalline polymer 2 and vice versa. As the mixture of amorphous polymer 6 and crystalline polymer 2 (with or without wood fibers 3) is extruded through the die 19, amorphous polymer 6 may tend to go towards outer surface 5 of profile body 1, for example, due the pressures exerted on feed 10 during extrusion. In another example, due to the molecular structure of both crystalline polymer 2 and amorphous polymer 6, the polymer chain of amorphous polymer 6 cannot interlock easily with the polymer chain and/or matrix of crystalline polymer 2. Accordingly, amorphous polymer 6 may tend to separate from the polymer matrix of crystalline polymer 2 and go to outer surface 5 so as to form its own solid polymer matrix of amorphous polymer 6. As amorphous polymer 6 reaches surface 5, because amorphous polymer 6 may have a different initial color and/or different resultant color as the rest of profile body 1 (i.e., blend 4 of crystalline polymer 2 and wood fibers 3), streaks 16 of amorphous polymer 6 may be readily discernible on outer surface 5. Streaks 16 may be generally perpendicular to a cross-section of die 19 through which profile body 1 is extruded. However, streaks 16 may be in any direction, and have any other shape and/or configuration, for example, similar to those set forth in FIGS. 2A-2C.

In another example, entire portions of outer surface 5 may be composed of amorphous polymer 6, for example, as shown in FIG. 3C. In such an example, the processing may have been such that amorphous polymer 6 forms "clumps" or "pockets" (e.g., as set forth in the previous paragraph) around substantially all of blend 4 so as to form a substantially solid matrix around blend 4 (e.g., with or without wood fibers 3). Any suitable proportions of amorphous polymer 6, crystalline polymer 2, wood-fibers 3, blend 4, blend 18, background color 9, and another other material or compound set forth herein are contemplated as being discernible on outer surface 5.

The method may also include providing another amorphous polymer 7, melting another amorphous polymer 7, and mixing another amorphous polymer 7 with amorphous polymer 6, crystalline polymer 2, and/or wood fibers 3. With the addition of additional amorphous polymer 7, the step of extruding may include forming profile body 1 such that outer surface 5 deliberately evinces a third color different from the first color and the second color due to additional amorphous polymer 7.

Another amorphous polymer 7 may be selected because its initial color and/or resultant color may be different from an initial color and/or resultant color of one or more of crystalline polymer 2 and/or wood fibers 3. Another amorphous polymer 7 may processed and/or behave similarly to other amorphous polymers 6, thus, streaks 16B of another amorphous polymer 7 may be formed on outer surface 5 of profile body 1. Streaks 16B from another amorphous polymer 7 may be of a color different from either the base color of profile body 1 and/or the color of streaks 16A from amorphous polymer 6.

As shown in FIG. 4B, the method may also include providing a core 8 and forming profile body 1 around at least a portion of core 8. Core 8 may be a wood-plastic composite or any other suitable composite. Core 8 may have a cross-sectional area smaller than a cross-sectional area of die 19. Core 8 may be fed by extruder 15 through die 19 such that core 8 advances through substantially the center of die 19 without contacting any portion of die 19 itself. Extruder 15 and/or die 19 may then deposit an outer surface 5 on core 8 that has more than one color (e.g., variegated and/or streaked) using one or more of the methods set forth herein. The variegated surface 5 may be bonded to core 8 using any suitable method, for example, when variegated surface 5 is co-extruded onto core 8, a portion of core 8 may melt and intermix with variegated surface 5 such that core 8 and the variegated surface 5 are substantially fused. Accordingly, the resultant product may be a building material with a core 8 having a wood-plastic composite having a deliberately variegated outer surface 5 formed around it. Such a resultant product may be desirable, for example, to impart strength to the component (e.g., by providing a core component having a high strength such as aluminum or steel).

The method also may include the use of a background color 9. As shown in FIG. 4B, background color 9 may be added to crystalline polymer 2 and/or wood fiber 3 (e.g., blend 4) to impart a color to blend 4 different from an initial color of blend 4, crystalline polymer 2, and/or wood fiber 3. Background color 9, crystalline polymer 2, wood fibers 3, and/or blend 4 may be processed by processor 13 using any suitable apparatus and/or method to form resultant blend 4. Resultant blend 4 may then be transferred to extruder 15 and processed with amorphous polymer 6 to form profile body 1 with streaks 16 or other variations of outer surface 5 as set forth herein. Background color 9 may be added to any step of the process and/or any component or subcomponent of the process at any time prior to extrusion through die 19.

In a preferred embodiment, as shown in FIG. 4C, background color 9 may be added to amorphous polymer 6 to impart a color to amorphous polymer 6 different from an initial color of amorphous polymer 6. Background color 9 and/or amorphous polymer 6 may be processed by processor 17 using any suitable apparatus and/or method to form resultant blend 18 of amorphous polymer 6 and background color 9. Resultant blend 18 may then be transferred to extruder 15 and processed with crystalline polymer 2, wood fibers 3, and/or blend 4 to form profile body 1 with streaks 16 or other variations of outer surface 5 as set forth herein. Once again, background color 9 may be added to any step of the process and/or any component or subcomponent of the process at any time prior to extrusion through die 19.

One of ordinary skill in the art will recognize that some aspects of the invention may be multiplied so as to form different embodiments of the invention. For example, there may be a plurality of crystalline polymers, a plurality of types of wood fibers, and/or a plurality of amorphous polymers used.

One of ordinary skill of art will further recognize that some of the aspects of set forth herein may be combined with other aspects set forth herein to form different embodiments of the invention. For example, composite 1 with streaks having multiple colors may also include a core.

One of ordinary skill in the art will also recognize that some of the aspects set forth herein may be removed to form different embodiments of the invention. For example, crystalline polymer 2 and wood fibers need not be blended prior to mixing them with amorphous polymer 6.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A composite, comprising:
   a crystalline polymer;
   a plurality of wood fibers blended with the crystalline polymer to form a substantially homogenous blend;
   an outer surface of the composite; and
   an amorphous polymer having a first color, said amorphous polymer being free of wood fibers of other fillers, and the substantially homogenous blend of the crystalline polymer and the plurality of wood fibers has a second color different from the first color,
   wherein the composite includes a substantially immiscible mixture of the substantially homogenous blend and the amorphous polymer, such that the first color associated with the amorphous polymer does not blend with the second color associated with the substantially homogenous blend, and
   wherein the outer surface includes the substantially immiscible mixture of the substantially homogenous blend and the amorphous polymer, the first color being distributed predominantly on the outer surface of the composite such that the amorphous polymer and the first color are not uniformly distributed throughout the composite.

2. The composite of claim 1, wherein the crystalline polymer includes at least one of polypropylene and polyethylene.

3. The composite of claim 1, wherein the amorphous polymer is a styrenic polymer.

4. The composite of claim 1, wherein the outer surface includes streaks of the first color.

5. The composite of claim 1, wherein the amorphous polymer has a melting temperature that is substantially the same as a melting temperature of the crystalline polymer.

6. The composite of claim 1, wherein the outer surface of the composite is variegated by the first color and the second color.

7. The composite of claim 1, wherein a first portion of the outer surface has the first color and a second portion of the outer surface has the second color.

8. A composite comprising:
   a crystalline polymer;
   a plurality of wood fibers blended with the crystalline polymer to form a substantially homogenous blend;
   an outer surface of the composite;
   an amorphous polymer having a first color, and the substantially homogenous blend of the crystalline polymer and the plurality of wood fibers has a second color different from the first color, and
   another amorphous polymer, the another amorphous polymer having a third color different from the first color and the second color,
   wherein the composite includes a substantially immiscible mixture of the substantially homogenous blend, the amorphous polymer, and the another amorphous polymer, and
   wherein the outer surface includes the substantially immiscible mixture of the substantially homogenous blend, the amorphous polymer, and the another amorphous polymer.

9. The composite of claim 1, wherein the composite is at least one of a building material, a decking material, a railing component, and a decking board.

10. The composite of claim 1, further comprising a colorant blended with one or more of the crystalline polymer and the amorphous polymer,
    wherein the colorant has a color different from a color of the one or more of the crystalline polymer and amorphous polymer,
    wherein a substantially homogenous blend of the colorant and the one or more of the crystalline polymer and amorphous polymer has the color of the colorant.

11. The composite of claim 1, wherein at least one of the substantially homogenous blend and the amorphous polymer is miscibly blended with at least one of a biostabilizer and a biocide.

12. The composite of claim 1, wherein the amorphous polymer makes up between about 5% and as little as less than 1% of the composite by weight.

13. The composite of claim 1, wherein the amorphous polymer makes up about 2% of the composite by weight.

14. A composite, comprising:
    a substantially homogenous blend including a crystalline polymer and a plurality of wood fibers; and
    a substantially immiscible mixture of the substantially homogenous blend and an amorphous polymer, wherein the substantially homogenous blend is of a first color and the amorphous polymer is of a second color different from the first color, and wherein the composite includes a variegation of the first color and the second color, said variegation being visible on an outer surface of the composite, but said variegation not being uniform throughout a mass of the composite.

15. The composite of claim 14, wherein the crystalline polymer is at least one of polypropylene and polyethylene.

16. The composite of claim 14, wherein the amorphous polymer is a styrenic polymer.

17. The composite of claim 14, wherein the outer surface includes streaks of the second color.

18. The composite of claim 14, wherein the amorphous polymer has a melting temperature that is substantially the same as a melting temperature of the crystalline polymer.

19. A composite comprising:
a substantially homogenous blend including a crystalline polymer and a plurality of wood fibers; and
a substantially immiscible mixture of the substantially homogenous blend and an amorphous polymer,
wherein the substantially homogenous blend is of a first color and the amorphous polymer is of a second color different from the first color,
wherein the composite includes a variegation of the first color and the second color,
wherein the substantially immiscible mixture includes another amorphous polymer different from the amorphous polymer,
wherein the another amorphous polymer is substantially immiscible with the substantially homogenous blend, and
wherein the another amorphous polymer has a third color different from the first color and the second color.

20. The composite of claim 14, wherein the composite is at least one of a building material, a decking material, a railing component, and a decking board.

21. The composite of claim 14, further comprising a colorant blended with one or more of the crystalline polymer and the amorphous polymer,
wherein the colorant has a color different from a color of the one ore more of the crystalline polymer and amorphous polymer,
wherein a substantially homogenous blend of the colorant and the one or more of the crystalline polymer and amorphous polymer has the color of the colorant.

22. The composite of claim 14, wherein the plurality of wood fibers are substantially free of the amorphous polymer.

23. The composite of claim 14, wherein the amorphous polymer of the composite is substantially free of the plurality of wood fibers.

24. The composite of claim 14, wherein at least one of the substantially homogenous blend and the amorphous polymer is miscibly blended with at least one of a biostabilizer and a biocide.

25. The composite of claim 14, wherein the amorphous polymer makes up between about 5% and as little as less than 1% of the composite by weight.

26. The composite of claim 14, wherein the amorphous polymer makes up about 2% of the composite by weight.

27. A composite, comprising:
a substantially immiscible mixture of a crystalline polymer and an amorphous polymer; and
a plurality of wood fibers dispersed throughout the crystalline polymer,
wherein the crystalline polymer is of a first color and the amorphous polymer is of a second color different from the first color, and wherein said first and second colors are not blended and are separately visible on a surface of the composite, and
wherein the amorphous polymer is substantially free of the plurality of wood fibers.

28. The composite of claim 27, wherein the crystalline polymer is at least one of polypropylene and polyethylene.

29. The composite of claim 27, wherein the amorphous polymer is a styrenic polymer.

30. The composite of claim 27, wherein the amorphous polymer has a melting temperature that is substantially the same as a melting temperature of the crystalline polymer.

31. The composite of claim 27, further comprising an outer surface including the substantially immiscible mixture of the crystalline polymer and the amorphous polymer.

32. The composite of claim 31, wherein the outer surface includes streaks of the second color.

33. The composite of claim 30, wherein the outer surface of the composite is variegated.

34. The composite of claim 30, wherein a first portion of the outer surface has the first color and a second portion of the outer surface has the second color.

35. A composite comprising:
a substantially immiscible mixture of a crystalline polymer and an amorphous polymer; and
a plurality of wood fibers dispersed throughout the crystalline polymer,
wherein the crystalline polymer is of a first color and the amorphous polymer is of a second color different from the first color
wherein the amorphous polymer is substantially free of the plurality of wood fibers,
wherein the substantially immiscible mixture includes another amorphous polymer different from the amorphous polymer,
wherein the another amorphous polymer is substantially immiscible with the crystalline polymer, and
wherein the another amorphous polymer has a third color different from the first color and the second color.

36. The composite of claim 27, wherein the composite is at least one of a building material, a decking material, a railing component, and a decking board.

37. The composite of claim 27, further comprising a colorant blended with one or more of the crystalline polymer and the amorphous polymer,
wherein the colorant has a color different from a color of the one or more of the crystalline polymer and amorphous polymer,
wherein a substantially homogenous blend of the colorant and the one or more of the crystalline polymer and amorphous polymer has the color of the colorant.

38. The composite of claim 27, wherein at least one of the crystaline polymer and the amorphous polymer is miscibly blended with at least one of a biostabilizer and a biocide.

39. The composite of claim 27, wherein the amorphous polymer makes up between about 5% and as little as less than 1% of the composite by weight.

40. The composite of claim 27, wherein the amorphous polymer makes up about 2% of the composite by weight.

41. A composite, comprising:
a substantially homogenous blend including a crystalline polymer and a plurality of wood fibers;
a mixture of the substantially homogenous blend and an amorphous polymer, said amorphous polymer being free of wood fibers or any other filler; and
an outer surface of the composite, the outer surface including the mixture, wherein the substantially homogenous blend is of a first color and the amorphous polymer is of a second color different from the first color, and wherein the first color and the second color are separately visible on the outer surface of the composite, the second color being distributed predominantly on the outer surface of the composite.

42. The composite of claim 41, wherein the crystalline polymer is at least one of polypropylene and polyethylene.

43. The composite of claim 41, wherein the amorphous polymer is a styrenic polymer.

44. The composite of claim 41, wherein the amorphous polymer has a melting temperature that is substantially the same as a melting temperature of the crystalline polymer.

45. The composite of claim 41, wherein the outer surface includes streaks of the second color.

46. The composite of claim 41, wherein the outer surface of the composite is variegated.

47. The composite of claim 41, wherein a first portion of the outer surface has the first color and a second portion of the outer surface has the second color.

48. The composite of claim 41,
a substantially homogenous blend including a crystalline polymer and a plurality of wood fibers;
a mixture of the substantially homogenous blend and an amorphous polymer; and
an outer surface of the composite, the outer surface including the mixture,
wherein the substantially homogenous blend is of a fisrt color and the amorphous polymer is of a second color different from the first color,
wherein the first color and the second color are separately visible on the outer surface of the composite,
wherein the mixture includes another amorphous polymer different from the amorphous polymer, and
wherein the another amorphous polymer has a third color different from the first color and the second color.

49. The composite of claim 41, wherein the composite is at least one of a building material, a decking material, a railing component, and a decking board.

50. The composite of claim 41, further comprising a colorant blended with one or more of the crystalline polymer and the amorphous polymer,
wherein the colorant has a color different from a color of the one or more of the crystalline polymer and amorphous polymer,
wherein a substantially homogenous blend of the colorant and the one or more of the crystalline polymer and amorphous polymer has the color of the colorant.

51. The composite of claim 41, wherein at least one of the crystaline polymer and the amorphous polymer is miscibly blended with at least one of a biostabilizer and a biocide.

52. The composite of claim 41, wherein the amorphous polymer makes up between about 5% and as little as less than 1% of the composite by weight.

53. The composite of claim 41, wherein the amorphous polymer makes up about 2% of the composite by weight.

54. The composite of claim 41, wherein the plurality of wood fibers are substantially free of the amorphous polymer.

55. The composite of claim 41, wherein the amorphous polymer of the composite is substantially free of the plurality of wood fibers.

56. A composite comprising:
a crystalline polymer;
a plurality of wood fibers blended with the crystalline polymer to form a substantially homogenous blend;
an outer surface of the composite; and
an amorphous polymer having a first color, and the substantially homogenous blend of the crystalline polymer and the plurality of wood fibers has a second color different from the first color, said amorphous polymer being a polycarbonate or a styrenic polymer,
wherein the composite includes a substantially immiscible mixture of the substantially homogenous blend and the amorphous polymer, and
wherein the outer surface includes the substantially immiscible mixture of the substantially homogenous blend and the amorphous polymer.

57. A composite comprising:
a substantially homogenous blend including a crystalline polymer and a plurality of wood fibers; and
a substantially immiscible mixture of the substantially homogenous blend and an amorphous polymer, said amorphous polymer being a polycarbonate or a styrenic polymer,
wherein the substantially homogenous blend is of a first color and the amorphous polymer is of a second color different from the first color, and
wherein the composite includes a variegation of the first color and the second color.

58. A composite comprising:
a substantially immiscible mixture of a crystalline polymer and an amorphous polymer, said amorphous polymer being a polycarbonate or a styrenic polymer; and
a plurality of wood fibers dispersed throughout the crystalline polymer,
wherein the crystalline polymer is of a first color and the amorphous polymer is of a second color different from the first color, and
wherein the amorphous polymer is substantially free of the plurality of wood fibers.

59. A composite comprising:
a substantially homogenous blend including a crystalline polymer and a plurality of wood fibers;
a mixture of the substantially homogenous blend and an amorphous polymer, said amorphous polymer being a polycarbonate or a styrenic polymer; and
an outer surface of the composite, the outer surface including the mixture,
wherein the substantially homogenous blend is of a first color and the amorphous polymer is of a second color different from the first color, and
wherein the first color and the second color are separately visible on the outer surface of the composite.

* * * * *

UNITED STATES PATENT AND TRADEMARK OFFICE
CERTIFICATE OF CORRECTION

PATENT NO. : 7,410,687 B2 Page 1 of 1
APPLICATION NO. : 10/862448
DATED : August 12, 2008
INVENTOR(S) : Blair Dolinar It is certified that error appears in the above-identified patent and that said Letters Patent is hereby corrected as shown below:

Title Page, Insert
--(73) Assignee: TREX COMPANY, INC.
160 Exeter Drive
Winchester, VA 22603-8605--.

Title Page, Delete "(76)" and Insert --(75)--.

Signed and Sealed this

Fourth Day of May, 2010

David J. Kappos
*Director of the United States Patent and Trademark Office*